United States Patent
Shamasundar et al.

(10) Patent No.: US 10,672,279 B2
(45) Date of Patent: Jun. 2, 2020

(54) SYSTEMS AND METHODS FOR PRESENTING AN INTUITIVE TIMELINE VISUALIZATION VIA AN AVIONICS PRIMARY FLIGHT DISPLAY (PFD)

(71) Applicant: HONEYWELL INTERNATIONAL INC., Morris Plains, NJ (US)

(72) Inventors: Raghu Shamasundar, Karnataka (IN); Mahesh Sivaratri, Karnataka (IN)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 233 days.

(21) Appl. No.: 15/715,408

(22) Filed: Sep. 26, 2017

(65) Prior Publication Data

US 2019/0096267 A1  Mar. 28, 2019

(51) Int. Cl.
| | |
|---|---|
| *G06F 3/0482* | (2013.01) |
| *G08G 5/00* | (2006.01) |
| *H04B 7/185* | (2006.01) |
| *G01C 23/00* | (2006.01) |
| *H04W 76/15* | (2018.01) |

(52) U.S. Cl.
CPC ......... *G08G 5/0021* (2013.01); *G01C 23/005* (2013.01); *G06F 3/0482* (2013.01); *G08G 5/0013* (2013.01); *G08G 5/0052* (2013.01); *H04B 7/18506* (2013.01); *H04W 76/15* (2018.02); *G08G 5/0091* (2013.01)

(58) Field of Classification Search
CPC ............................ G08G 5/0021; G06F 3/0482
USPC ...................................................... 715/753
See application file for complete search history.

(56) References Cited

U.S. PATENT DOCUMENTS 6,160,497 A    12/2000  Clark
6,313,759 B1 * 11/2001  Musland-Sipper .......... G08G 5/0013
                                                    340/945

(Continued)

FOREIGN PATENT DOCUMENTS

EP    2327962 A2    6/2011
EP    2574965 A2    4/2013

(Continued)

OTHER PUBLICATIONS

European Patent and Trademark Office, European Extended Search Report for Application No. 18193322.7 dated Mar. 21, 2019.

*Primary Examiner* — Daniel Rodriguez
(74) *Attorney, Agent, or Firm* — Lorenz & Kopf, LLP

(57) ABSTRACT

A method for providing air traffic control (ATC) message data onboard an aircraft is provided. The method establishes communication connections to one or more aircraft onboard communication devices, wherein each of the one or more aircraft onboard communication devices is configured to provide the ATC message data using a particular format; obtains the ATC message data via the communication connections; aggregates the ATC message data, to create an aggregate set of ATC message data; presents a menu of user-selectable options based on an aircraft state, by a display device, wherein each of the user-selectable options is associated with a category of the aggregate set of ATC message data; receives a user input selection of one of the user-selectable options; and presents graphical elements and text associated with the category of the aggregate set of ATC message data, in response to the user input selection.

17 Claims, 15 Drawing Sheets

(56) References Cited

U.S. PATENT DOCUMENTS

| | | | |
|---|---|---|---|
| 7,191,406 B1 | 3/2007 | Barber et al. | |
| 8,346,411 B1* | 1/2013 | Dirks | G08G 5/0013 340/425.5 |
| 8,380,366 B1* | 2/2013 | Schulte | G01C 23/00 701/120 |
| 8,484,576 B2 | 7/2013 | Berson et al. | |
| 9,202,380 B1* | 12/2015 | Shapiro | G08G 5/0082 |
| 9,318,024 B1* | 4/2016 | Natwick | G08G 5/0013 |
| 9,573,698 B1 | 2/2017 | He | |
| 9,898,165 B1* | 2/2018 | Turcios | G01C 23/00 |
| 2003/0016158 A1* | 1/2003 | Stayton | G08G 5/0008 342/29 |
| 2003/0016159 A1* | 1/2003 | Stayton | G08G 5/0008 342/30 |
| 2003/0025719 A1 | 2/2003 | Palmer et al. | |
| 2003/0137444 A1* | 7/2003 | Stone | G08G 5/0008 342/30 |
| 2005/0182528 A1* | 8/2005 | Dwyer | G01C 23/00 701/3 |
| 2007/0241936 A1* | 10/2007 | Arthur | G01C 23/00 340/958 |
| 2008/0163093 A1* | 7/2008 | Lorido | G01C 23/00 715/771 |
| 2010/0153875 A1* | 6/2010 | O'Flynn | G08G 5/0026 715/786 |
| 2011/0029225 A1 | 2/2011 | Stayton et al. | |
| 2012/0245836 A1* | 9/2012 | White | G08G 5/065 701/120 |
| 2013/0027226 A1* | 1/2013 | Cabos | G08G 5/0013 340/961 |
| 2014/0039734 A1* | 2/2014 | Ramaiah | G08G 5/0021 701/14 |
| 2014/0350753 A1* | 11/2014 | Depape | G08G 5/02 701/3 |
| 2015/0089392 A1* | 3/2015 | McGuffin | G08G 5/0013 715/753 |
| 2015/0261829 A1* | 9/2015 | Whitlow | G01C 23/00 707/722 |
| 2015/0355832 A1* | 12/2015 | Dostal | G06F 3/04855 715/771 |
| 2016/0041001 A1* | 2/2016 | Samuthirapandian | G01C 23/00 340/977 |
| 2016/0047674 A1* | 2/2016 | Ramaiah | G01C 23/005 340/995.27 |
| 2016/0057032 A1* | 2/2016 | Tieftrunk | G01C 21/00 701/533 |
| 2016/0125741 A1* | 5/2016 | Shorter, Jr. | G06F 3/00 701/528 |
| 2016/0125744 A1* | 5/2016 | Shamasundar | G08G 5/0039 701/122 |
| 2016/0140849 A1* | 5/2016 | Ball | G08G 5/0021 701/538 |
| 2016/0171899 A1* | 6/2016 | Depare | G08G 5/065 701/120 |
| 2016/0209234 A1* | 7/2016 | Passinger | B64D 43/00 |
| 2016/0217693 A1* | 7/2016 | Samuthirapandian | G01C 23/00 |
| 2017/0054490 A1* | 2/2017 | Zeng | H04B 7/18506 |
| 2017/0124734 A1 | 5/2017 | Gowda | |
| 2017/0212604 A1* | 7/2017 | Bragason | G06F 3/0219 |
| 2017/0345318 A1* | 11/2017 | Kim | G08G 5/0013 |
| 2018/0188935 A1* | 7/2018 | Singh | G06F 3/04842 |

FOREIGN PATENT DOCUMENTS

| | | |
|---|---|---|
| EP | 2624237 A1 | 8/2013 |
| EP | 2980773 A1 | 2/2016 |
| WO | 2007005658 A2 | 1/2007 |

* cited by examiner

SYSTEMS AND METHODS FOR PRESENTING AN INTUITIVE TIMELINE VISUALIZATION VIA AN AVIONICS PRIMARY FLIGHT DISPLAY (PFD)

TECHNICAL FIELD

Embodiments of the subject matter described herein relate generally to providing air traffic control (ATC) message data onboard an aircraft. More particularly, embodiments of the subject matter relate to aggregating ATC message data from a plurality of sources, and presenting the aggregated ATC message data.

BACKGROUND

Communications between air traffic control (ATC) and aircraft is critical to successful operation of an aircraft prior to, during, and after completion of a flight plan. Typically, ATC messages provide instructions specific to takeoff, landing, and flight operations such that the flight crew of each aircraft is capable of operating and maneuvering the aircraft in airspace. Currently, communications are received onboard an aircraft via a plurality of different devices and in a plurality of different formats. Voice communications, text communications, notifications, airport data, air traffic data, chart data, and other types of alerts and messages may be received for consideration by the flight crew during completion of a flight plan. Flight crew members receive multiple communications of varying source, format, and receiving device, and make flight operations decisions based on these received communications. However, the various devices and formats used to transmit and receive ATC messages may unnecessarily complicate the decision-making process for the flight crew.

Accordingly, it is desirable to provide ATC message data in an efficient and intuitive manner. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for providing air traffic control (ATC) message data onboard an aircraft. The method establishes, by a processor, communication connections to one or more aircraft onboard communication devices, wherein each of the one or more aircraft onboard communication devices is configured to provide the ATC message data using a particular format; obtains the ATC message data via the communication connections, by the processor; aggregates the ATC message data, by the processor, to create an aggregate set of ATC message data; presents a menu of user-selectable options based on an aircraft state, via a display device communicatively coupled to the processor, wherein each of the user-selectable options is associated with a category of the aggregate set of ATC message data, and wherein the aircraft state comprises at least an aircraft position, fuel flow of the aircraft, a current phase of flight, a current aircraft mission, and a current spatial orientation of the aircraft; receives a user input selection of one of the user-selectable options, by the processor; and presents graphical elements and text associated with the category of the aggregate set of ATC message data, in response to the user input selection.

Some embodiments of the present disclosure provide a system for providing air traffic control (ATC) message data onboard an aircraft. The system includes: a system memory element; a plurality of communication connections to one or more aircraft external communication devices that provide communication datalinks between the aircraft and air traffic control (ATC), wherein each of the one or more aircraft onboard communication devices is configured to provide the ATC message data using a particular format; a display device, configured to present graphical elements and text associated with aircraft data; a user interface, configured to receive user input selections from a menu of user-selectable options; and at least one processor, communicatively coupled to the system memory element, the one or more aircraft onboard communication devices, the display device, and the user interface, the at least one processor configured to: obtain the ATC message data via the communication connections; aggregate the ATC message data to create an aggregate set of ATC message data; present a menu of user-selectable options based on an aircraft state, via a display device communicatively coupled to the processor, wherein each of the user-selectable options is associated with a category of the aggregate set of ATC message data, and wherein the aircraft state comprises at least an aircraft position, fuel flow of the aircraft, a current phase of flight, a current aircraft mission, and a current spatial orientation of the aircraft; receive a user input selection of one of the user-selectable options, via the user interface; and present graphical elements and text associated with the category of the aggregate set of ATC message data, in response to the user input selection.

Some embodiments of the present disclosure provide a non-transitory, computer-readable medium containing instructions thereon, which, when executed by a processor, perform a method for providing air traffic control (ATC) message data onboard an aircraft. The method establishes, by the processor, communication connections to one or more aircraft onboard communication devices, wherein each of the one or more aircraft onboard communication devices is configured to provide the ATC message data using a particular format, and wherein the one or more aircraft onboard communication devices comprising at least one of a cockpit receiver, a Controller Pilot Datalink Communication (CP-DLC) device, an Automatic Terminal Information Service (ATIS) receiver device, a Notice to Airmen (NOTAM) receiver device, or an aircraft radio; obtains the ATC message data via the communication connections, by the processor; aggregates the ATC message data, by the processor, to create an aggregate set of ATC message data; presents a menu of user-selectable options based on an aircraft state, via a display device communicatively coupled to the processor, wherein each of the user-selectable options is associated with a category of the aggregate set of ATC message data, and wherein the aircraft state comprises at least an aircraft position, fuel flow of the aircraft, a current phase of flight, a current aircraft mission, and a current spatial orientation of the aircraft; receives a user input selection of one of the user-selectable options, by the processor; and presents graphical elements and text associated with the category of the aggregate set of ATC message data, in response to the user input selection.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to systems and methods for consolidating and presenting air traffic control (ATC) message data received onboard an aircraft during execution of a current flight plan. In certain embodiments, the subject matter relates to the presentation of consolidated ATC message data concurrently with a Primary Flight Display (PFD). Also contemplated herein is the presentation of consolidated ATC message data via other integrated aircraft displays or one or more external computing devices (e.g., using an executed Electronic Flight Bag (EFB) application).

Certain terminologies are used with regard to the various embodiments of the present disclosure. For example, air traffic control (ATC) message data may include any message data received onboard an aircraft, via a plurality of communication devices and including a plurality of message communication formats. Aggregated ATC message data includes ATC messages transmitted by ground entities and received by the aircraft, wherein the ATC messages may be received via a plurality of aircraft onboard communication devices.

Figure 1:
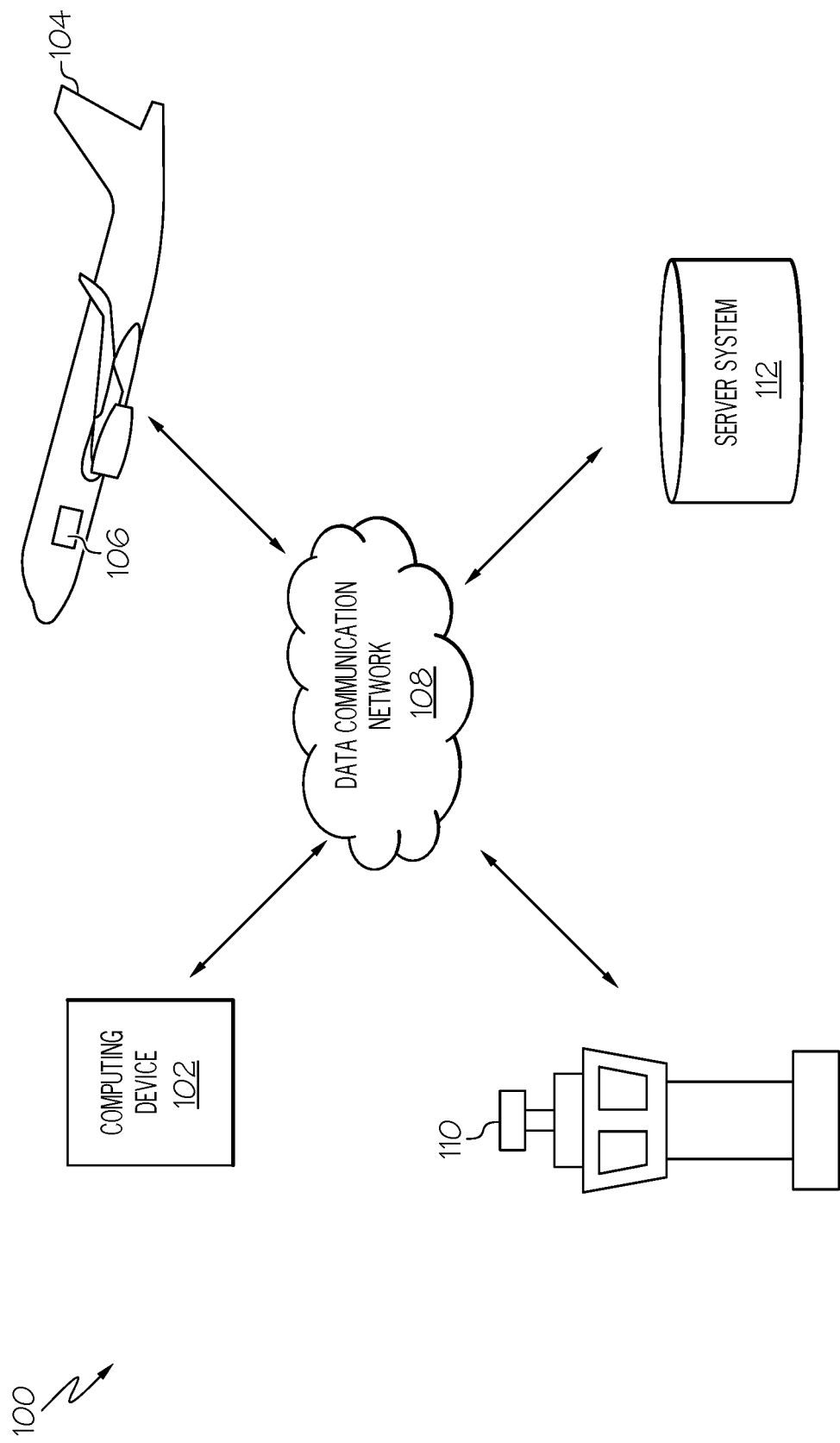
FIG. 1 is a diagram of a system for providing a consolidated air traffic control (ATC) message data onboard an aircraft, in accordance with the disclosed embodiments.

Turning now to the figures, FIG. 1 is a diagram of a system 100 for providing a consolidated air traffic control (ATC) message data onboard an aircraft 104, in accordance with the disclosed embodiments. The system 100 operates to obtain, consolidate, and present ATC message data from multiple sources onboard an aircraft 104 during flight. The system 100 may include, without limitation, a computing device 102 that communicates with one or more communication devices 106 onboard the aircraft 104, air traffic control (ATC) 110 or other ground systems, and at least one server system 112, via a data communication network 108. In practice, certain embodiments of the system 100 may include additional or alternative elements and components, as desired for the particular application.

The computing device 102 may be implemented by any computing device that includes at least one processor, some form of memory hardware, a user interface, and communication hardware. For example, the computing device 102 may be implemented using a personal computing device, such as a tablet computer, a laptop computer, a personal digital assistant (PDA), a smartphone, or the like. In this scenario, the computing device 102 is capable of storing, maintaining, and executing an Electronic Flight Bag (EFB) application configured to consolidate and present ATC message data. In other embodiments, the computing device 102 may be implemented using a computer system onboard and/or integrated into the aircraft 104, which is configured to consolidate and present ATC message data.

The aircraft 104 may be any aviation vehicle for which messages or other communications transmitted by air traffic control 110 are received and used by the flight crew for decision making purposes during flight. The aircraft 104 may be implemented as an airplane, helicopter, spacecraft, hovercraft, or the like. The one or more communication devices 106 may include at least one of a cockpit receiver, a Controller Pilot Datalink Communication (CPDLC) device, an Automatic Terminal Information Service (ATIS) receiver device, a Notice to Airmen (NOTAM) receiver device, or an aircraft radio. Data obtained from the one or more communication devices 106 may include, without limitation: oceanic clearance data (e.g., an oceanic entry point, time bounds for the oceanic entry point); air traffic control (ATC) timeline data comprising at least a received ATC message, a current flight path for the aircraft, timing data associated with the flight path, and potential effects on the flight path corresponding to the received ATC message; Notice to Airmen (NOTAM) data, a current flight path for the aircraft, and timing data associated with the current flight path; taxi clearance data, a current flight path for the aircraft, and timing data associated with the current flight path; and/or any other type of data received onboard the aircraft 104 which may be obtained by the computing device 102 via the data communication network 108.

The server system 112 may include any number of application servers, and each server may be implemented using any suitable computer. In some embodiments, the server system 112 includes one or more dedicated computers. In some embodiments, the server system 112 includes one or more computers carrying out other functionality in addition to server operations. The server system 112 may store and provide any type of data used to obtain, consolidate, and present ATC message data. Such data may include, without limitation: flight plan data, graphical elements, symbols (e.g., symbology elements) and text appropriate for the presentation of various categories of aggregated ATC message data, and other data compatible with the computing device 102.

The computing device 102 is usually located onboard the aircraft 104, and the computing device 102 communicates with the one or more communication devices 106 via wired and/or wireless communication connection. The computing device 102 and the server system 112 are generally disparately located, and the computing device 102 communicates with the server system 112 via the data communication network 108 and/or via communication mechanisms onboard the aircraft 104.

The data communication network 108 may be any digital or other communications network capable of transmitting messages or data between devices, systems, or components. In certain embodiments, the data communication network 108 includes a packet switched network that facilitates packet-based data communication, addressing, and data routing. The packet switched network could be, for example, a wide area network, the Internet, or the like. In various embodiments, the data communication network 108 includes any number of public or private data connections, links or network connections supporting any number of communications protocols. The data communication network 108 may include the Internet, for example, or any other network based upon TCP/IP or other conventional protocols. In various embodiments, the data communication network 108 could also incorporate a wireless and/or wired telephone network, such as a cellular communications network for communicating with mobile phones, personal digital assistants, and/or the like. The data communication network 108 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

The air traffic control (ATC) 110 center generally transmits data messages to the aircraft 104 that include flight crew instructions and aircraft operations for performance during completion of a current flight plan. The ATC 110 may be an official air traffic control center, a ground control center, or any other ground-based entity communicating with the aircraft 104 before, during, and post-flight. Further, the ATC 110 may include more than one source of message transmissions. For example, the ATC 110 may be a combination of an air traffic control center, a ground control center, and additional ground-based personnel communicating with the aircraft. In this example, the computing device 102 obtains ATC message data transmitted by all three ground-based entities (e.g., the ATC, the ground control, and the other ground-based personnel) received by the aircraft 104.

During typical operation, the computing device 102 obtains relevant ATC message data received by the aircraft 104. The computing device 102 obtains the relevant ATC message data from the one or more communication devices 106 onboard the aircraft 104. The computing device 102 then aggregates the ATC message data obtained from the multiple communication devices in multiple communication formats, and presents a new interface comprising graphical elements (including symbols) and text associated with the aggregated ATC message data. From the new interface, the user (e.g., a flight crew member) may make a selection of one of the categories of ATC message data, thus triggering the computing device 102 to present graphical elements and text associated with the particular category of ATC message data. Generally, the new interface presents timing data (e.g., a timeline associated with the current flight plan), graphical elements illustrating effects of ATC message instructions, and alerts associated with conditions requiring flight crew attention during completion of the current flight plan. The computing device 102 continually updates the aggregated set of ATC message data as additional communications are received during completion of the current flight plan. Thus, the presentation of the new interface, and included graphical elements and text, is also continually updated during execution of the current flight plan.

Figure 2:
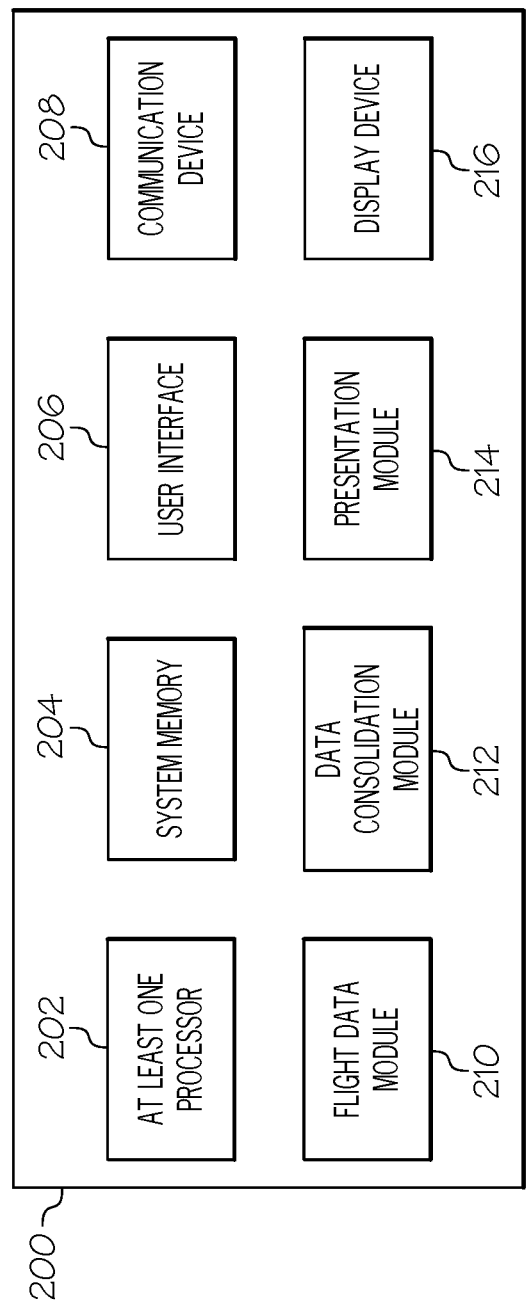
FIG. 2 is a functional block diagram of a computing device for use as part of a consolidated ATC message data system, in accordance with the disclosed embodiments.

FIG. 2 is a functional block diagram of a computing device 200 for use as part of a consolidated ATC message data system, in accordance with the disclosed embodiments. It should be noted that the computing device 200 can be implemented with the computing device 102 depicted in FIG. 1. In this regard, the computing device 200 shows certain elements and components of the computing device 200 in more detail.

The computing device 200 generally includes, without limitation: at least one processor 202; system memory 204; a user interface 206; a communication device 208; a flight data module 210; a data consolidation module 212; a presentation module 214; and a display device 216. These elements and features of the computing device 200 may be operatively associated with one another, coupled to one another, or otherwise configured to cooperate with one another as needed to support the desired functionality—in particular, dynamically obtaining, aggregating, and presenting ATC message data onboard an aircraft during flight, as described herein. For ease of illustration and clarity, the various physical, electrical, and logical couplings and interconnections for these elements and features are not depicted in FIG. 2. Moreover, it should be appreciated that embodiments of the computing device 200 will include other elements, modules, and features that cooperate to support the desired functionality. For simplicity, FIG. 2 only depicts certain elements that relate to the ATC message data aggregation and presentation techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 is communicatively coupled to the system memory 204. The system memory 204 is configured to store any obtained or generated data associated with ATC message data, and graphical elements associated with the consolidated ATC message data system. The system memory 204 may be realized using any number of devices, components, or modules, as appropriate to the embodiment. Moreover, the computing device 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computing device 200. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The user interface 206 may include or cooperate with various features to allow a user to interact with the computing device 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, an eye-tracking device, a gesture control device, or any device, component, or function that enables the user to select options, input information, or otherwise control the operation of the computing device 200. For example, the user interface 206 could be manipulated by an operator to enter a user selection of a menu option associated with a category of ATC message data, as described herein.

In certain embodiments, the user interface 206 may include or cooperate with various features to allow a user to interact with the computing device 200 via graphical elements rendered on a display element (e.g., the display device 216). Accordingly, the user interface 206 may initiate the creation, maintenance, and presentation of a graphical user interface (GUI). In certain embodiments, the display device 216 implements touch-sensitive technology for purposes of interacting with the GUI. Thus, a user can manipulate the GUI by moving a cursor symbol rendered on the display device 216, or by physically interacting with the display device 216 itself for recognition and interpretation, via the user interface 206.

The communication device 208 is suitably configured to communicate data between the computing device 200 and one or more remote servers and one or more communication devices onboard an aircraft. The communication device 208 may transmit and receive communications over a wireless local area network (WLAN), the Internet, a satellite uplink/downlink, a cellular network, a broadband network, a wide area network, or the like. As described in more detail below, data received by the communication device 208 may include, without limitation: flight plan data, graphical elements (e.g., symbols) elements and text associated with a particular aggregated ATC message data category, ATC message data obtained from one or more communication devices onboard the aircraft, and other data compatible with the computing device 200. Data provided by the communication device 208 may include, without limitation: requests for graphical elements and text associated with a particular aggregated ATC message data category, aggregated and consolidated ATC message data for presentation via an external display device, or the like.

The flight data module 210 is configured to request and obtain (via the communication device 208) stored flight data relevant to a current flight plan of the aircraft. Flight data may be obtained from a remote server system, an onboard storage medium, or any other data storage location communicatively coupled to the computing device 200. Relevant flight data may include flight plan data, timing data (e.g., flight plan timeline data), oceanic clearance data, Notice to Airmen (NOTAM) data, Terminal Weather Information for Pilots (TWIP) data, Air Traffic Information Service (ATIS) data, taxi clearance data, reporting points data, Flight deck Interval Management (FIM) data, and approach preview data.

The data consolidation module 212 is configured to obtain and aggregate air traffic control (ATC) message data such that ATC message data obtained from different sources and in different data formats may be presented to a user using a combined interface and in a consolidated manner. The data consolidation module 212 communicates with one or more aircraft onboard communication devices (via the communication device 208) to obtain ATC message data. The one or more aircraft onboard communication devices may include, without limitation: a cockpit receiver, a Controller Pilot Datalink Communication (CPDLC) device, an Automatic Terminal Information Service (ATIS) receiver device, a Notice to Airmen (NOTAM) receiver device, or an aircraft radio. The data consolidation module 212 may obtain ATC message data received by the aircraft using one or more transmission formats, including but not limited to: voice data or speech data, text data, official notice data (e.g., NOTAMs), electronic chart data, broadcast data, or any other type of data transmitted to, and received by, the aircraft.

The presentation module 214 is configured to provide a graphical interface (via the user interface 206 and the display device 216) for presenting consolidated ATC message data and flight data to the flight crew via the computing device 200. The presentation module 214 provides graphical elements and text associated with each category of aggregated ATC message data, for presentation via the display device 216. The presentation module 214 uses flight data (obtained via the flight data module 210) to provide context for obtained and aggregated ATC message data, and presents the graphical elements and text using the determined context. FIGS. 3-14 illustrate graphical elements and text associated with each category of aggregated ATC message data, and appropriate context for the graphical elements and text based on the flight data.

The presentation module 214 generally presents a menu of user-selectable options, wherein each of the user-selectable options is associated with a particular category of aggregated ATC message data. When a selection of a particular category is made by a user (via the user interface 206), the presentation module 214 presents category-specific data in the form of graphical elements and text, wherein the category-specific data is updated in real-time during execution of a current flight plan by the aircraft.

The presentation module 214 can present the aggregate ATC message data, and associated graphical elements and text, via any appropriate display device 216. As one example, the presentation module 214 uses a display of an external computing device (e.g., a laptop computer, a tablet computer) that is communicatively coupled to the communication devices (see FIG. 1, reference 106) onboard the aircraft. As another example, the presentation module 214 uses a display of a computer system integrated into the aircraft. In this example, the presentation module 214 may present the menu of user-selectable options concurrently with a Primary Flight Display (PFD) graphical display, and present the graphical elements and text associated with the category concurrently with the PFD graphical display.

The display device 216 is configured to display various icons, text, and/or graphical elements associated with obtained and aggregated ATC message data. In an exemplary embodiment, the display device 216 is communicatively coupled to the user interface 206 and the at least one processor 202. The at least one processor 202, the user interface 206, and the display device 216 are cooperatively configured to display, render, or otherwise convey one or more graphical representations or images associated with obtained and aggregated ATC message data on the display device 216, as described in greater detail below. In an exemplary embodiment, the display device 216 is realized as an electronic display configured to graphically display ATC message data, as described herein. In some embodiments, the computing device 200 is an integrated computer system onboard an aircraft, and the display device 216 is located within a cockpit of the aircraft, and is thus implemented as an aircraft display. In other embodiments, the display device 216 is implemented as a display screen of a standalone, personal computing device (e.g., laptop computer, tablet computer). It will be appreciated that although the display device 216 may be implemented using a single display, certain embodiments may use additional displays (i.e., a plurality of displays) to accomplish the functionality of the display device 216 described herein.

Figure 3:
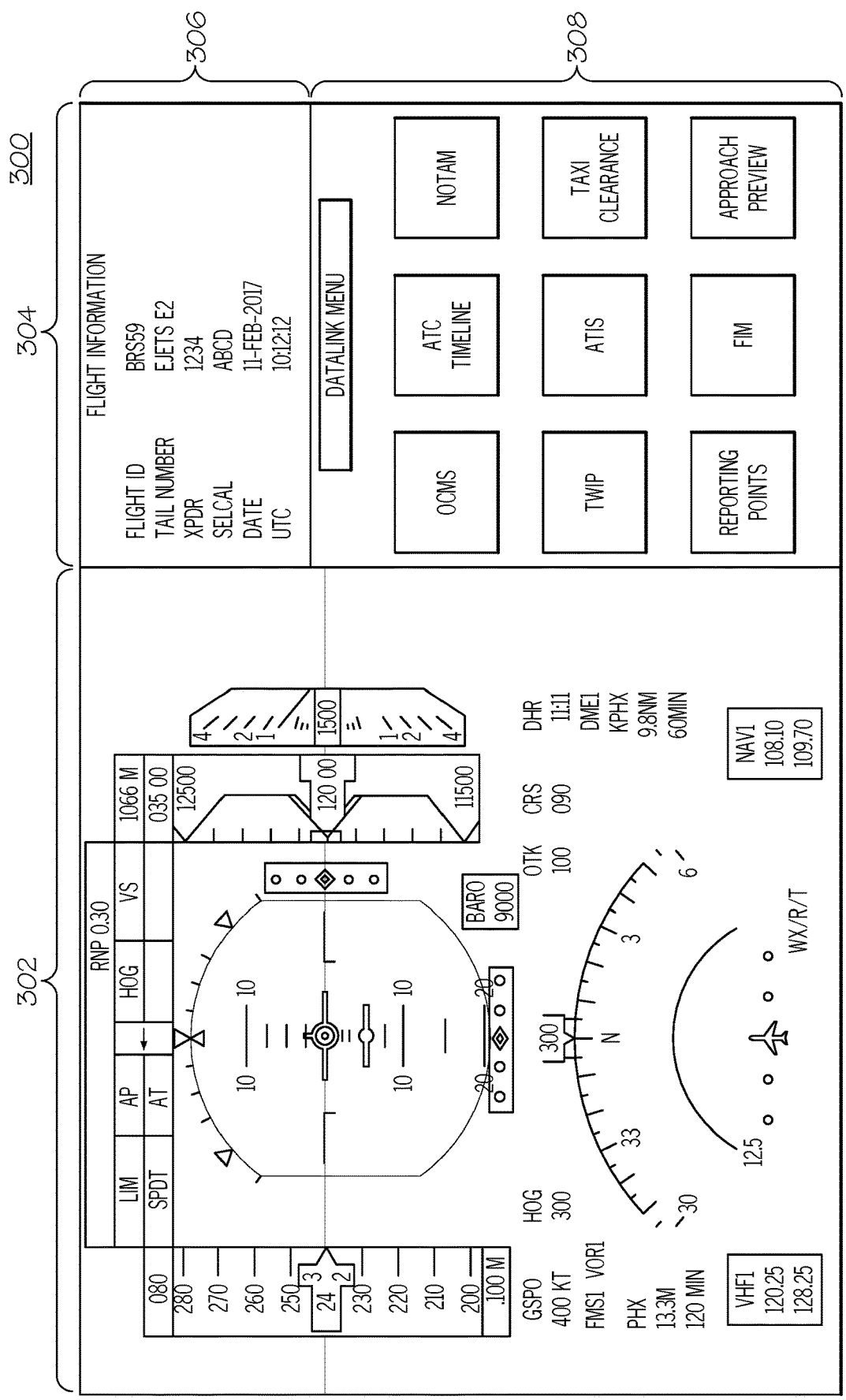
FIG. 3 is a diagram of a consolidated ATC message data display, in accordance with the disclosed embodiments.

FIG. 3 is a diagram of a consolidated air traffic control (ATC) message data display 300, in accordance with the disclosed embodiments. The exemplary embodiment of the consolidated ATC message data display 300 includes a graphical elements and text appropriate to an integrated aircraft onboard display system. It should be appreciated that other embodiments of the consolidated ATC message data display 300 may be implemented using an external computing device (e.g., a tablet computer, a laptop computer) and/or one or more externally connected display devices. As shown, the consolidated ATC message data display 300 includes graphical elements and text for a Primary Flight Display (PFD) 302 concurrently with an ATC message data interface 304.

The PFD 302 interface includes standard features and data that are well-known and commonly presented via typical Primary Flight Displays (PFDs) onboard an aircraft. Consistent with typical operation, the PFD 302 presentation changes based on current flight data. In some embodiments, the ATC message data interface 304 presents flight information 306 consistently, during user interactions with an ATC message data interface 304. The graphical elements and text presented by the ATC message data interface 304 change based on user selections and current flight data.

The ATC message data interface 304 initially presents a menu of user-selectable options 308, wherein each of the user-selectable options is associated with a particular category of aggregated ATC message data, and wherein the aggregated ATC message data is obtained by the system from a plurality of communication devices onboard the aircraft.

In the exemplary embodiment shown, the menu of user-selectable options 308 includes, but is not limited to: Oceanic Clearance Monitoring System (OCMS); Air Traffic Control (ATC) Timeline; Notice to Airmen (NOTAM); Terminal Weather Information for Pilots (TWIP); Air Traffic Information System (ATIS); Taxi Clearance; Reporting Points; Flight Interval Management (FIM); Approach Preview, and any other potential option for which graphical elements and text may be presented, in the context of flight path timing data and a flight path timeline, using a display and/or computing device onboard the aircraft during flight. However, other embodiments of the ATC message data interface 304 may include additional and/or fewer user-selectable categories of aggregated ATC message data. Each of the menu of user-selectable options is associated with a category of the aggregate set of ATC message data. For example, the OCMS selectable option is associated with OCMS data for the aircraft. As another example, the NOTAM selectable option is associated with NOTAM data received and stored onboard the aircraft. As a third example, the ATIS selectable option is associated with ATIS data received and stored onboard the aircraft.

Figure 4:
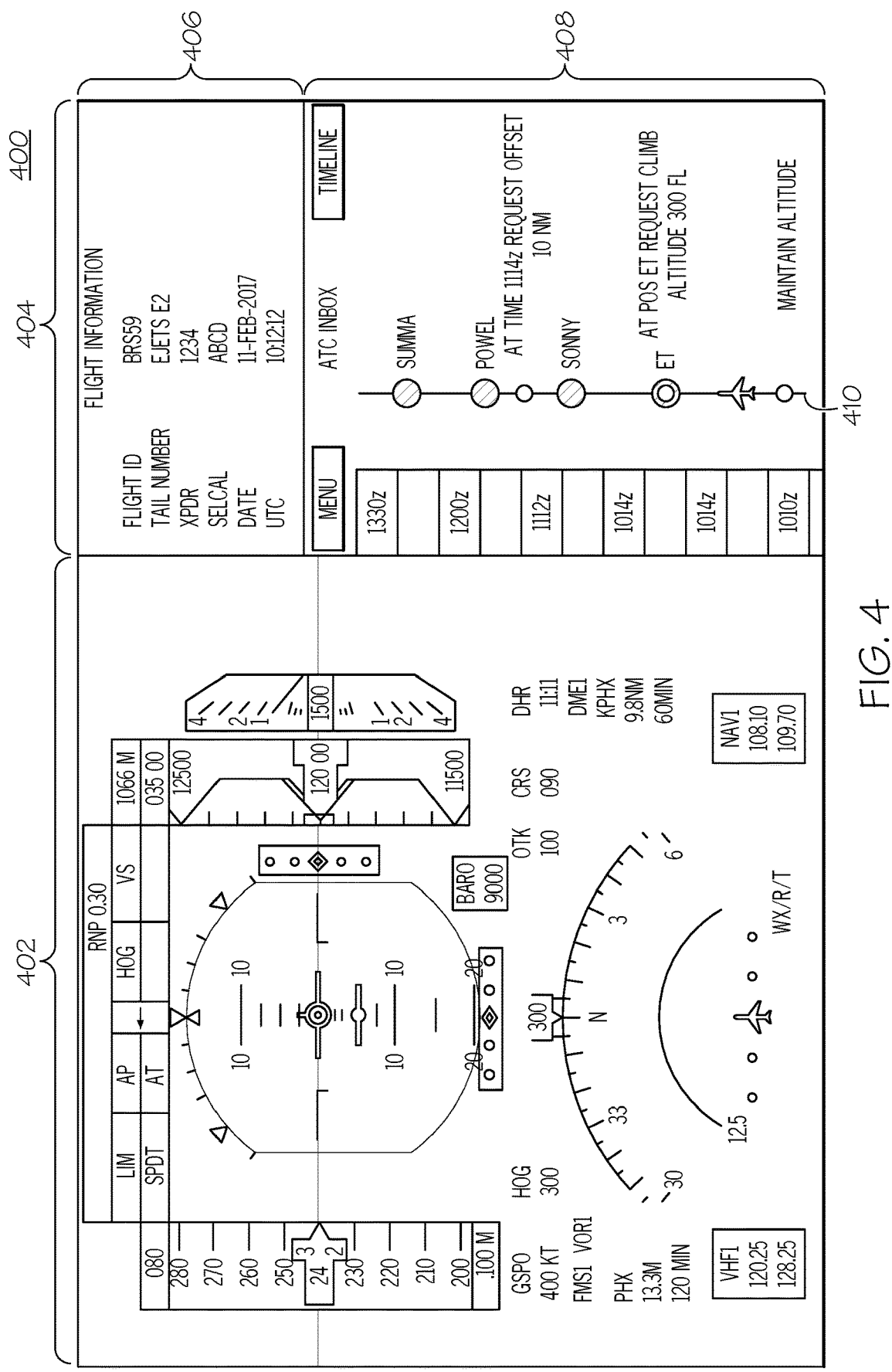
FIG. 4 is a diagram of an ATC Timeline selection display, in accordance with the disclosed embodiments.

FIG. 4 is a diagram of an ATC Timeline selection display 400, in accordance with the disclosed embodiments. The ATC Timeline selection display 400 is a presentation of graphical elements and text displayed when a user selects the "ATC Timeline" user-selectable option from the menu of user-selectable options shown in FIG. 3 (see reference 308). The ATC Timeline selection display 400 includes a Primary Flight Display (PFD) 402 and an ATC message data interface 404, consistent with the display presented in FIG. 3. Additionally, the ATC message data interface 404 includes flight information 406 that is continuously presented, during user interactions with an ATC message data interface 404. The graphical elements and text presented by the ATC message data interface 404 change based on user selections and current flight data. Here, after user selection of the "ATC Timeline" user-selectable option, the ATC message data interface 404 presents a timeline display 408 that includes the ATC message data and the current flight path. Additionally, the timeline display 408 includes effects and potential effects of the ATC message data on the current flight path, for informational purposes. Here, the timeline display 408 is presented to provide flight crew members increased situational awareness and, in some embodiments, alerts for critical operations onboard the aircraft.

As shown, the timeline display 408 includes a timeline 410 of the current flight path that includes a plurality of waypoints and indications of expected timing data for reaching each of the waypoints of the current flight path. Additionally, the timeline 410 includes notifications for the flight crew, positioned next to the timeline 410 at time values and location points associated with the condition triggering the alert. For example, at time 1010z, the timeline 410 presents an alert "MAINTAIN ALTITUDE". This alert is presented such that the flight crew is informed of the contents of an ATC message that has been received onboard the aircraft, obtained by the ATC message consolidation system or computing device, and is presented via the ATC message data interface 404, wherein the contents include a transmitted message that includes instructions to the flight crew to maintain altitude at time 1010z. Additional alerts or notifications are presented in conjunction with the timeline 410, to include "AT POS ET REQUEST CLIMB ALTITUDE 300 FT" at time 1014z, and "AT TIME 1114z REQUEST OFFSET 10 NM". Such advisories, alerts and/or notifications are presented by the timeline display 408 when the timeline display 408 is selected from the menu of user-selectable options.

Figure 5:
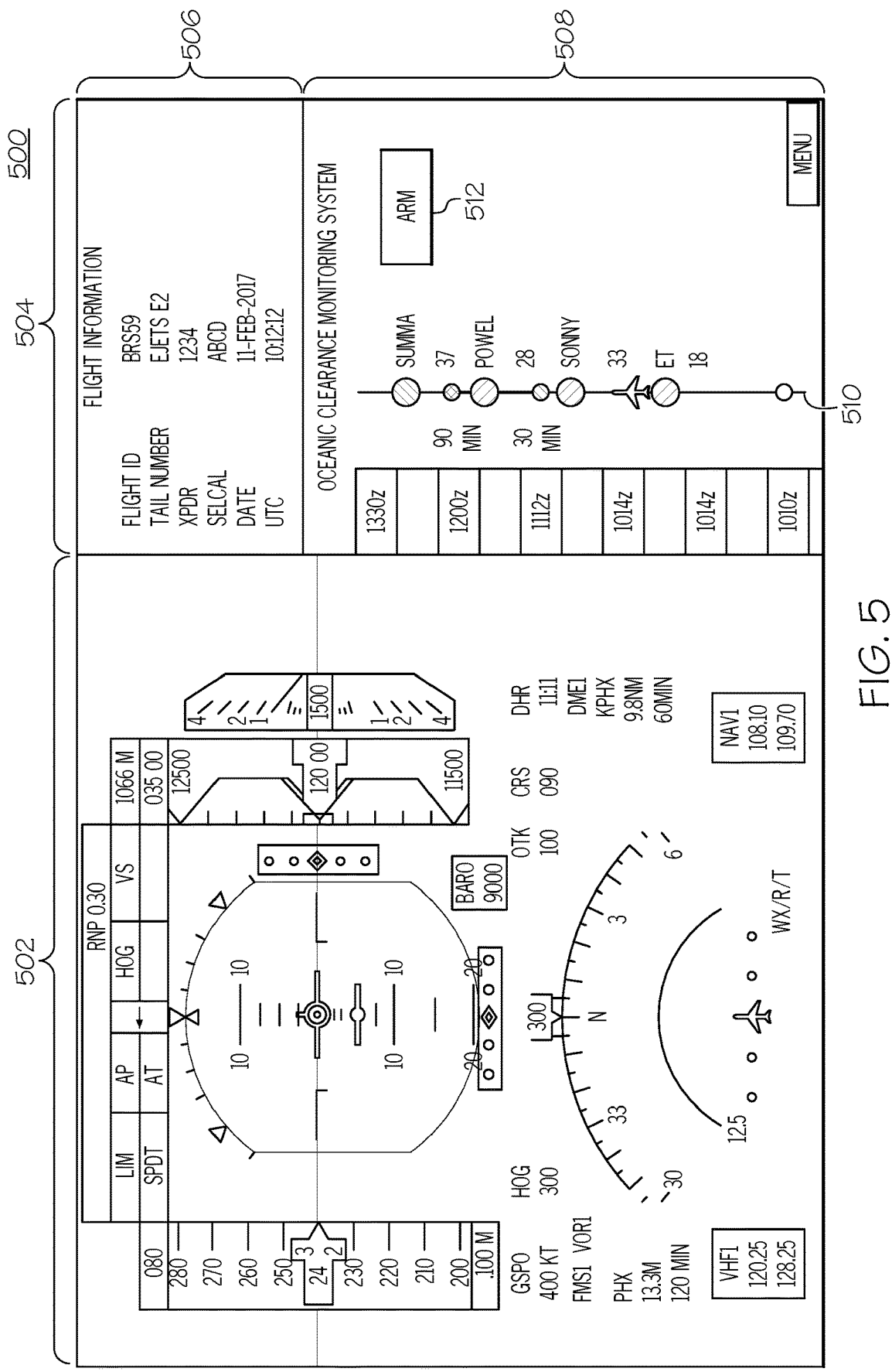
FIG. 5 is a diagram of an Oceanic Clearance Monitoring system (OCMS) selection display, in accordance with the disclosed embodiments.

FIG. 5 is a diagram of an Oceanic Clearance Monitoring (OCMS) selection display 500, in accordance with the disclosed embodiments. The OCMS selection display 500 is a presentation of graphical elements and text displayed when a user selects the "OCMS" user-selectable option from the menu of user-selectable options shown in FIG. 3 (see reference 308). The OCMS selection display 500 includes a Primary Flight Display (PFD) 502 and an ATC message data interface 504, consistent with the display presented in FIG. 3. Additionally, the ATC message data interface 504 includes flight information 506 that is continuously presented, during user interactions with an ATC message data interface 504.

The graphical elements and text presented by the ATC message data interface 504 change based on user selections and current flight data. Here, after user selection of the "OCMS" user-selectable option, the ATC message data interface 504 presents a timeline display 508. Additionally, the timeline display 508 may include additional user-selectable graphical elements to arm the OCMS onboard the aircraft. When selected by a user, the OCMS is armed and monitors an oceanic entry point with respect to the time bound, and associated OCMS data is presented by the timeline display 508.

As shown, the timeline display 508 includes a timeline 510 of the current flight path that includes a plurality of waypoints and indications of expected timing data for reaching each of the waypoints of the current flight path. Additionally, the timeline 510 includes OCMS data, positioned next to the timeline 510. The OCMS timeline 510 provides an indication of the oceanic entry point information for the flight crew. The thirty minutes ("30 Min") and ninety minutes ("90 Min") is a time-bound associated with oceanic entry point "SUMMA", and the flight crew is required to submit an Oceanic request within this time-bound. The distance value for each waypoint (e.g. 18 NM from ET to SONNY) is presented on the timeline 510, which increases situational awareness and, in some embodiments, also presents alerts for critical operations onboard the aircraft. The timeline display 508 also includes a graphical element representing second user-selectable option 512 to monitor the OCMS.

Figure 6:
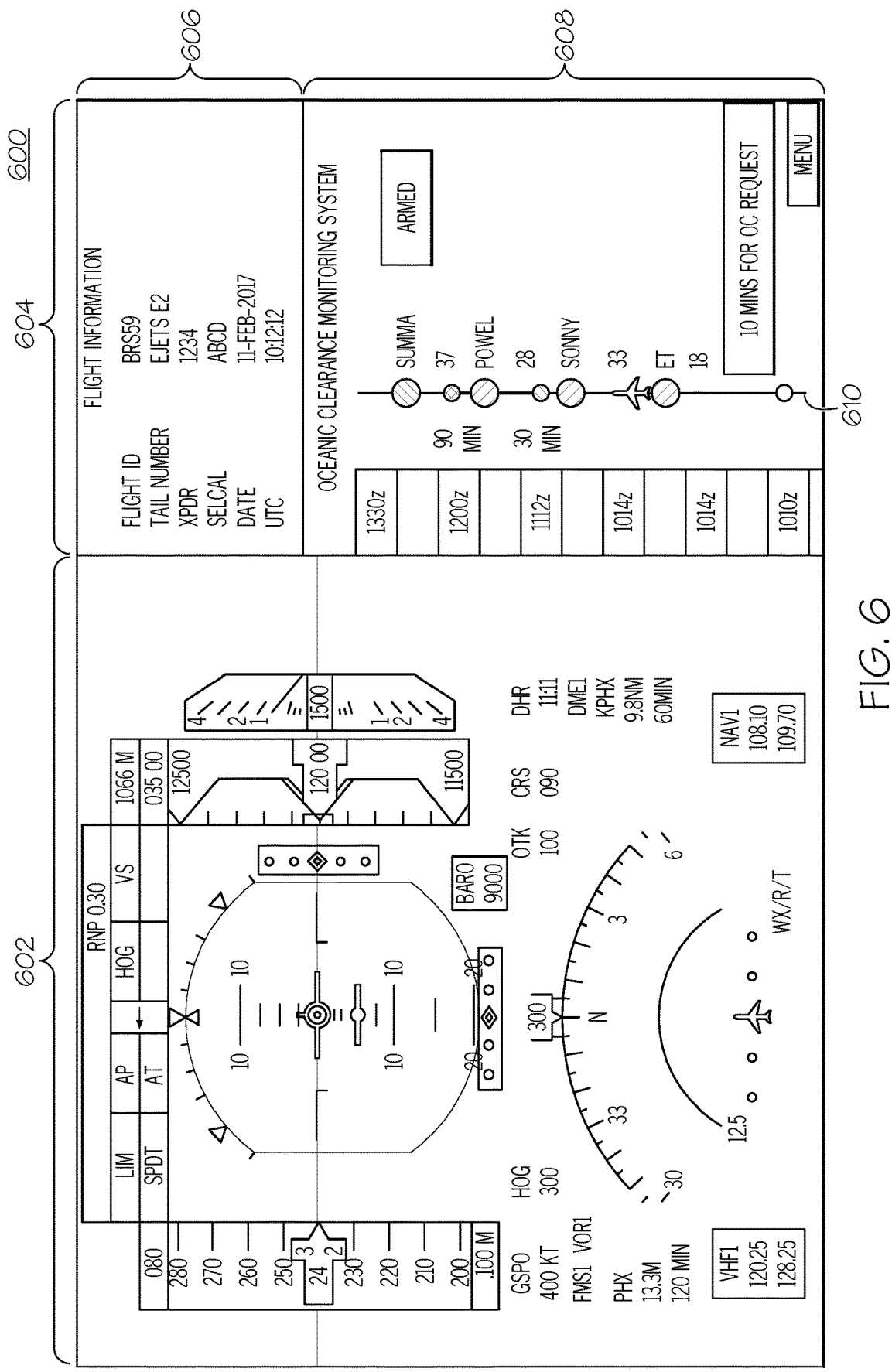
FIG. 6 is another diagram of an Oceanic Clearance Monitoring system (OCMS) selection display, in accordance with the disclosed embodiments.

FIG. 6 is another diagram of an Oceanic Clearance Monitoring System (OCMS) selection display 600, in accordance with the disclosed embodiments. The OCMS selection display 600 is a presentation of graphical elements and text displayed after a user first selects the "OCMS" user-selectable option from the menu of user-selectable options shown in FIG. 3 (see reference 308), and then selects a second user-selectable option to monitor the OCMS (see reference 512 of FIG. 5). The OCMS selection display 600 includes a Primary Flight Display (PFD) 602 and an ATC message data interface 604, consistent with the display presented in FIG. 3. Additionally, the ATC message data interface 604 includes flight information 606 that is continuously presented, during user interactions with an ATC message data interface 604. The graphical elements and text presented by the ATC message data interface 604 change based on user selections and current flight data. Here, after user selection of the "OCMS" user-selectable option, the ATC message data interface 604 presents a timeline display 608. Additionally, the timeline display 608 may include additional user-selectable graphical elements indicating that the OCMS has been monitored, which produces the effect of a monitoring function. Here, the system monitors the oceanic entry point time-bound with respect to the current flight path and provides additional message cues when the aircraft nears the oceanic request range. When selected by a user, the OCMS monitor function monitors an oceanic entry point with respect to the time-bound, and associated OCMS data is presented by the timeline display 608.

As shown, the timeline display 608 includes a timeline 610 of the current flight path that includes a plurality of waypoints and indications of expected timing data for reaching each of the waypoints of the current flight path. Additionally, the timeline 610 includes OCMS data, positioned next to the timeline 610. Additionally, the oceanic monitor function provides the message display when oceanic time-bound is near (e.g., "10 MINS FOR OC REQUEST" message) when the aircraft, at a current position, requires approximately ten minutes to travel to the initial Oceanic Clearance request range.

Figure 7:
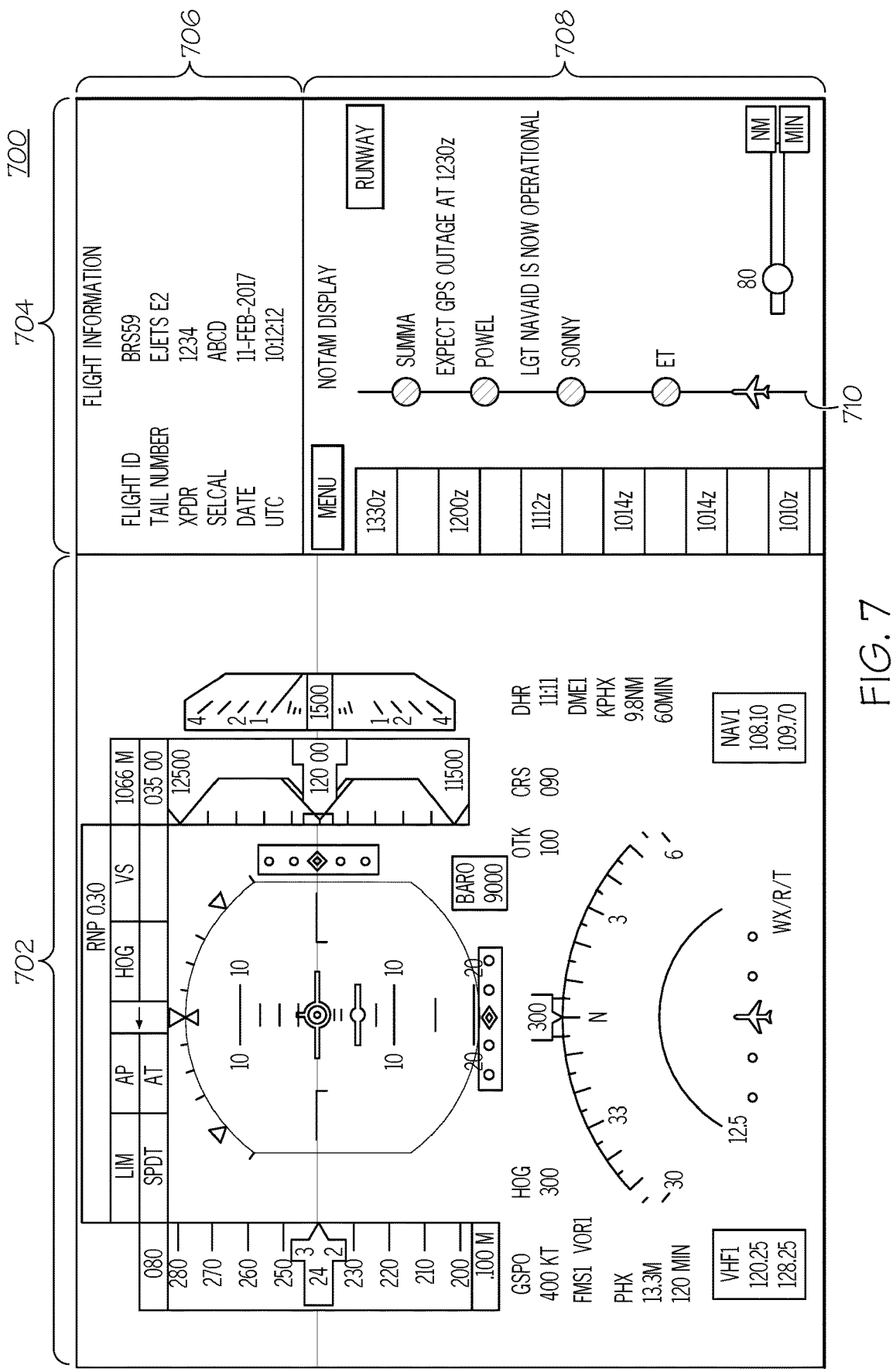
FIGS. 7-9 are diagrams of Notice to Airmen (NOTAM) selection displays, in accordance with the disclosed embodiments.

FIG. 7 is a diagram of a Notice to Airmen (NOTAM) selection display 700, in accordance with the disclosed embodiments. The NOTAM selection display 700 is a presentation of graphical elements and text displayed when a user selects the "NOTAM" user-selectable option from the menu of user-selectable options shown in FIG. 3 (see reference 308). The NOTAM selection display 700 includes a Primary Flight Display (PFD) 702 and an ATC message data interface 704, consistent with the display presented in FIG. 3. Additionally, the ATC message data interface 704 includes flight information 706 that is continuously presented, during user interactions with an ATC message data interface 704. The graphical elements and text presented by the ATC message data interface 704 change based on user selections and current flight data. Here, after user selection of the "NOTAM" user-selectable option, the ATC message data interface 704 presents a timeline display 708 that includes the ATC message data and the current flight path. Additionally, the timeline display 708 includes effects and potential effects of the ATC message data on the current flight path, for informational purposes. Here, the timeline display 708 is presented to provide flight crew members increased situational awareness and, in some embodiments, alerts for critical operations onboard the aircraft.

As shown, the timeline display 708 includes a timeline 710 of the current flight path that includes a plurality of waypoints and indications of expected timing data for reaching each of the waypoints of the current flight path. Additionally, the timeline 710 includes notifications (e.g., Notices to Airmen (NOTAMs)) for the flight crew, positioned next to the timeline 710 at time values and location points associated with the timing data of the NOTAM. For example, at time 1112*z*, the timeline 710 presents a NOTAM "LGT NAVAID IS NON-OPERATIONAL". This alert is presented such that the flight crew is informed of: (i) the contents of the NOTAM that has been received onboard the aircraft, and (ii) the applicability of the NOTAM to the current flight plan. Here, the NOTAM has been obtained by the ATC message consolidation system or computing device, and is presented via the ATC message data interface 704, wherein the contents include a NOTAM received onboard the aircraft. Additional NOTAMs are presented in conjunction with the timeline 710, to include "EXPECT GPS OUTAGE AT 1230*z*" at time 1230*z*. Such alerts and/or notifications are presented by the timeline display 708 when the NOTAM graphical element is selected from the menu of user-selectable options.

Figure 8:
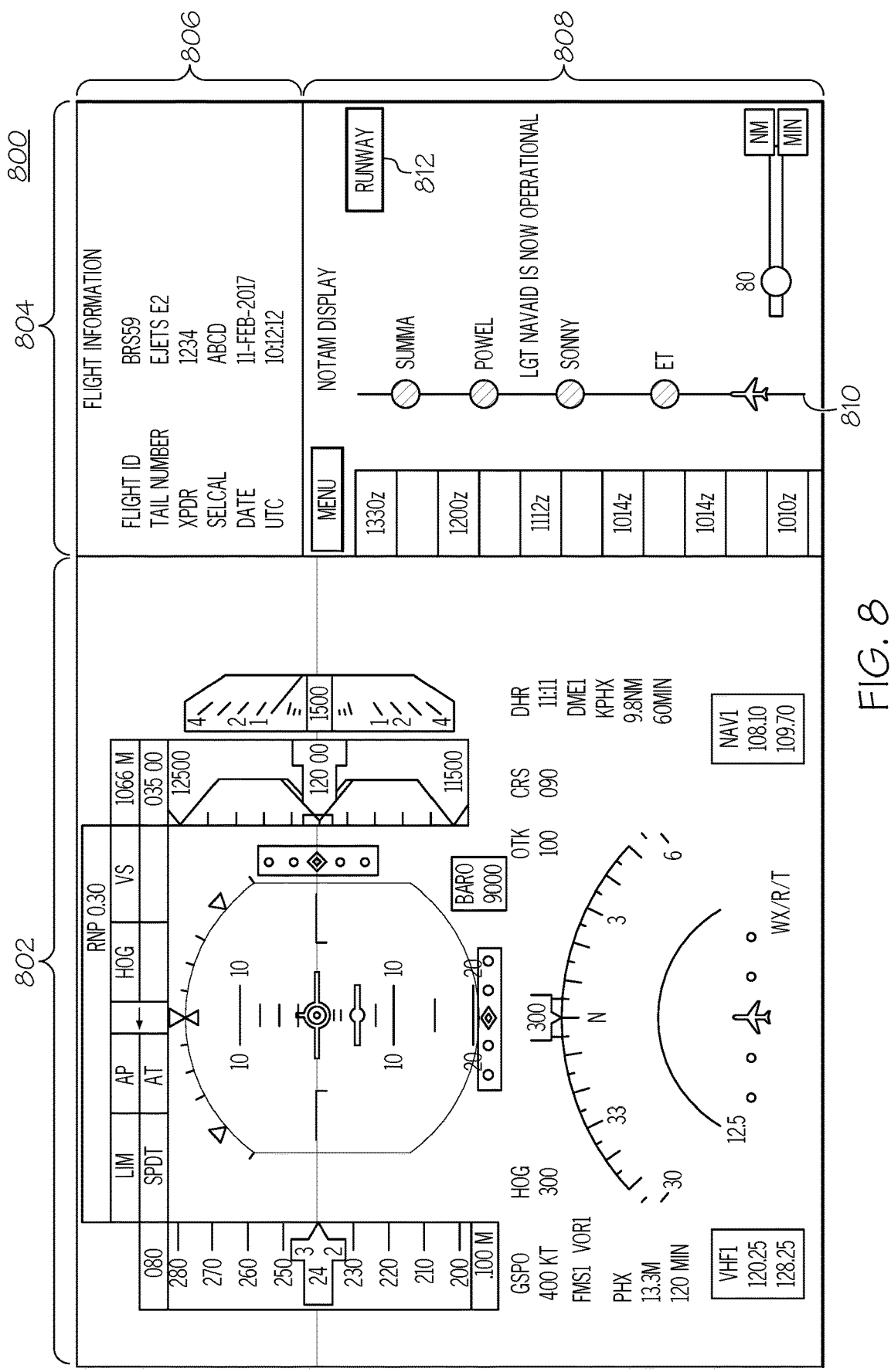

FIG. 8 is a second diagram of a Notice to Airmen (NOTAM) selection display 800, in accordance with the disclosed embodiments. The NOTAM selection display 800 is a presentation of graphical elements and text displayed when a user first selects the "NOTAM" user-selectable option from the menu of user-selectable options shown in FIG. 3 (see reference 308), and then the user secondly selects the Runway graphical element 812. The NOTAM selection display 800 includes a Primary Flight Display (PFD) 802 and an ATC message data interface 804, consistent with the display presented in FIG. 3. Additionally, the ATC message data interface 804 includes flight information 806 that is continuously presented, during user interactions with an ATC message data interface 804. The graphical elements and text presented by the ATC message data interface 804 change based on user selections and current flight data. Here, after user selection of the "NOTAM"

user-selectable option, the ATC message data interface 804 presents a timeline display 808 that includes the ATC message data, the current flight path, and the Runway graphical element 812. Additionally, when the Runway graphical element 812 has been selected, the timeline display 808 includes runway-specific NOTAM data, for informational purposes. Here, the timeline display 808 is presented to provide flight crew members increased situational awareness and, in some embodiments, alerts for critical operations onboard the aircraft.

As shown, the timeline display 808 includes a timeline 810 of the current flight path that includes a plurality of waypoints and indications of expected timing data for reaching each of the waypoints of the current flight path. Additionally, the timeline 810 includes runway-specific notifications (e.g., Notices to Airmen (NOTAMs)) for the flight crew, positioned next to the timeline 810 at time values and location points associated with the timing data of the NOTAM.

For example, at time 1112z, the timeline 810 presents a NOTAM "LGT NAVAID IS NON-OPERATIONAL". This alert is presented such that the flight crew is informed of the contents of the NOTAM that has been received onboard the aircraft, obtained by the ATC message consolidation system or computing device, and is presented via the ATC message data interface 804, wherein the contents include a NOTAM received onboard the aircraft. The additional NOTAMs presented in FIG. 7 have been filtered out of the presented data due to the user selection of the Runway graphical element 812. Such alerts and/or notifications are presented by the timeline display 808 when the NOTAM graphical element is selected from the menu of user-selectable options.

Figure 9:
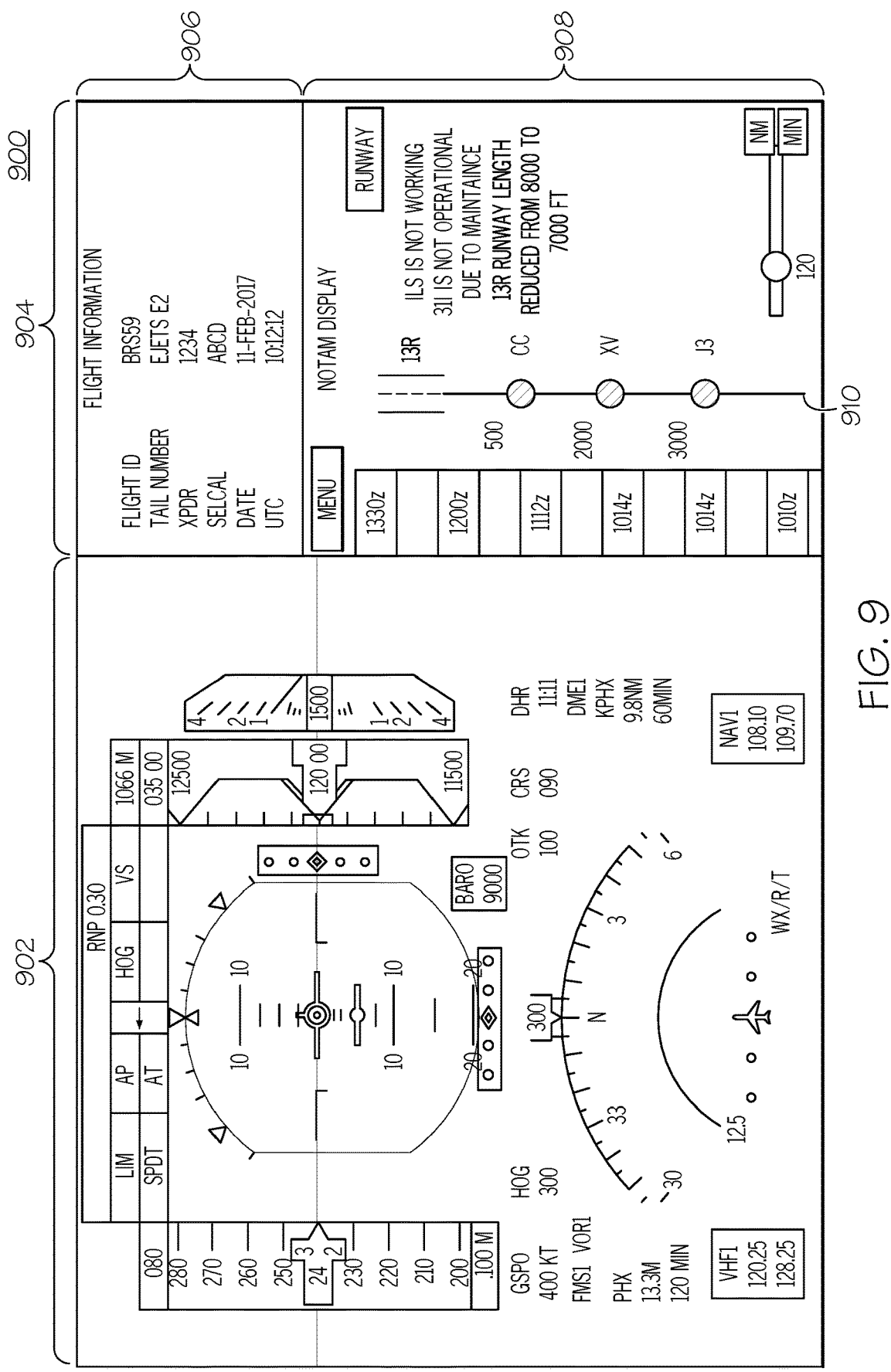

FIG. 9 is a third diagram of a Notice to Airmen (NOTAM) selection display 900, in accordance with the disclosed embodiments. The NOTAM selection display 900 is a presentation of graphical elements and text displayed when a user selects the "NOTAM" user-selectable option from the menu of user-selectable options shown in FIG. 3 (see reference 308). The NOTAM selection display 900 includes a Primary Flight Display (PFD) 902 and an ATC message data interface 904, consistent with the display presented in FIG. 3. Additionally, the ATC message data interface 904 includes flight information 906 that is continuously presented, during user interactions with an ATC message data interface 904. The graphical elements and text presented by the ATC message data interface 904 change based on user selections and current flight data. Here, after user selection of the "NOTAM" user-selectable option, the ATC message data interface 904 presents a timeline display 908 that includes the ATC message data and the current flight path. Additionally, the timeline display 908 includes effects and potential effects of the ATC message data on the current flight path, for informational purposes. Here, the timeline display 908 is presented to provide flight crew members increased situational awareness and, in some embodiments, alerts for critical operations onboard the aircraft.

As shown, the timeline display 908 includes a timeline 910 of the current flight path that includes a plurality of waypoints and indications of expected timing data for reaching each of the waypoints of the current flight path. Additionally, the timeline 910 includes notifications (e.g., Notices to Airmen (NOTAMs)) for the flight crew, positioned next to the timeline 910 at time values and location points associated with the timing data of the NOTAM. In the embodiment shown, the timeline 710 presents landing and runway NOTAM data specific to the current flight path. As shown, NOTAM data includes "13R RUNWAY LENGTH REDUCED FROM 8000 TO 7000 FT" and "ILS IS NOT WORKING 31I IS NOT OPERATIONAL DUE TO MAINTENANCE". Such alerts, notifications, and NOTAM data are presented by the timeline display 908 when the NOTAM graphical element is selected from the menu of user-selectable options.

Figure 10:
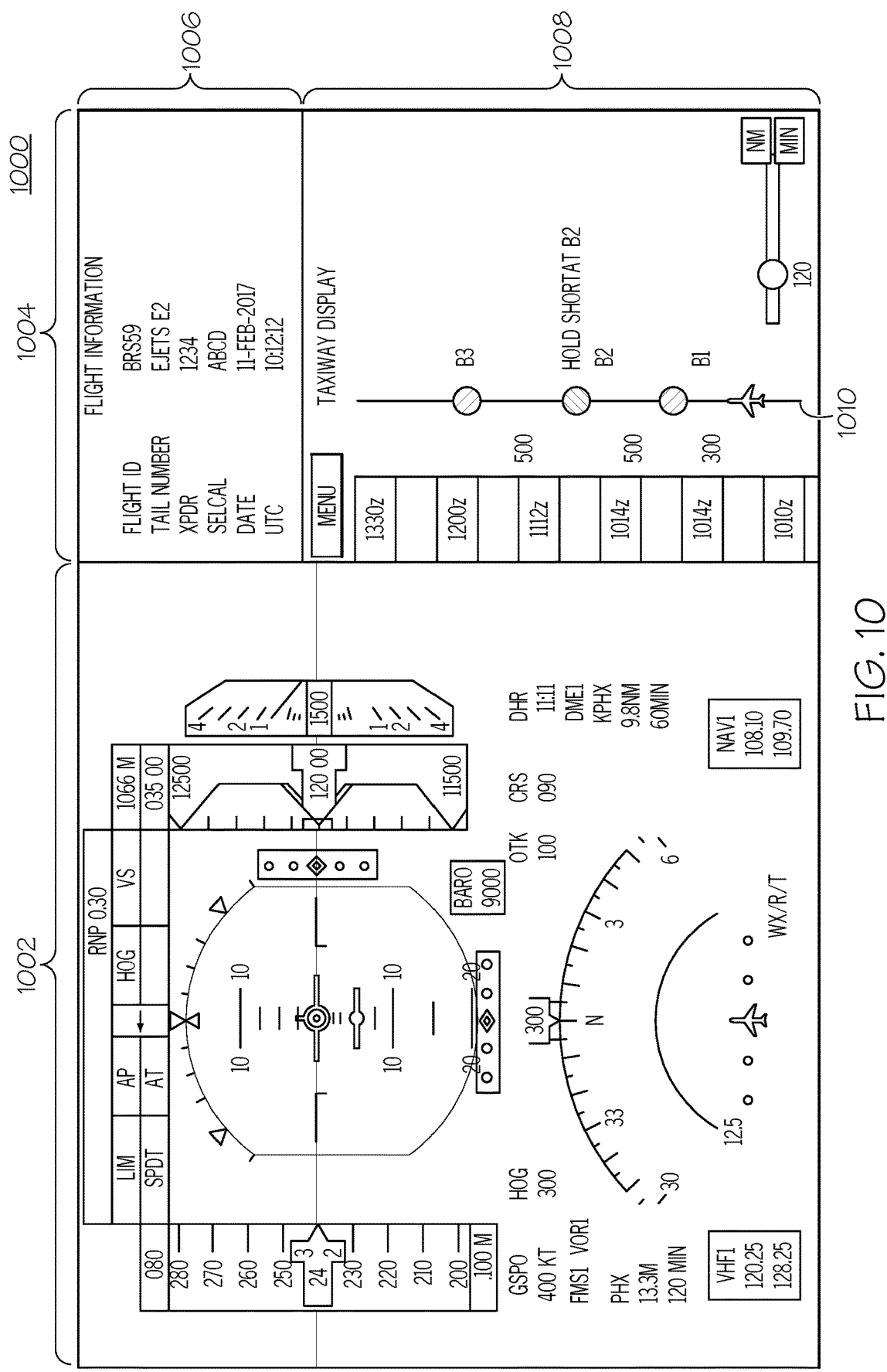
FIGS. 10-14 are diagrams of Taxi Clearance selection displays, in accordance with the disclosed embodiments.

FIG. 10 is a diagram of a Taxi Clearance selection display 1000, in accordance with the disclosed embodiments. The Taxi Clearance selection display 1000 is a presentation of graphical elements and text displayed when a user selects the "Taxi Clearance" user-selectable option from the menu of user-selectable options shown in FIG. 3 (see reference 308). The Taxi Clearance selection display 1000 includes a Primary Flight Display (PFD) 1002 and an ATC message data interface 1004, consistent with the display presented in FIG. 3. Additionally, the ATC message data interface 1004 includes flight information 1006 that is continuously presented, during user interactions with an ATC message data interface 1004. The graphical elements and text presented by the ATC message data interface 1004 change based on user selections and current flight data. Here, after user selection of the "Taxi Clearance" user-selectable option, the ATC message data interface 1004 presents a timeline display 1008 that includes the ATC message data and the current flight path. Additionally, the timeline display 1008 includes effects and potential effects of the ATC message data on the current flight path, for informational purposes. Here, the timeline display 1008 is presented to provide flight crew members increased situational awareness and, in some embodiments, alerts for critical operations onboard the aircraft.

As shown, the timeline display 1008 includes a timeline 1010 of the current flight path that includes a taxiway display and indications of expected timing data for reaching each of the indicated points of the taxiway display associated with the current flight path. Additionally, the timeline 1010 includes notifications for the flight crew, positioned next to the timeline 1010 at time values and location points associated with the condition triggering the alert. For example, at point B2, the timeline 1010 presents an alert "HOLD SHORT AT B2". This alert is presented such that the flight crew is informed of the contents of an ATC message that has been received onboard the aircraft, obtained by the ATC message consolidation system or computing device, and is presented via the ATC message data interface 1004, wherein the contents include a transmitted message that includes instructions to the flight crew to hold short at point B2 of the taxiway for the current flight path. Such alerts and/or notifications are presented by the timeline display 1008 when the Taxi Clearance selection display 1000 is selected from the menu of user-selectable options.

Figure 11:
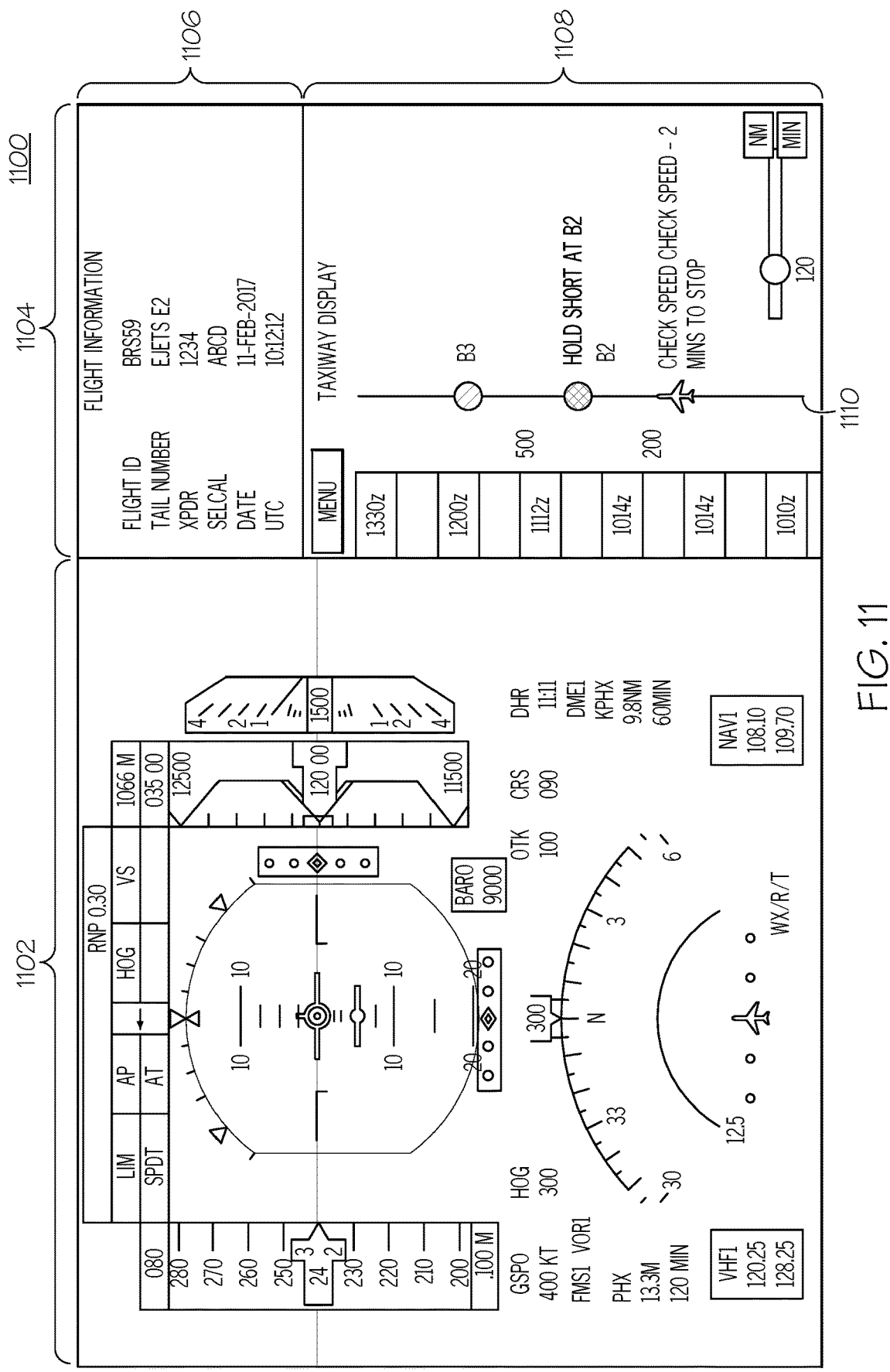

FIG. 11 is a second diagram of a Taxi Clearance selection display 1100, in accordance with the disclosed embodiments. It should be appreciated that FIG. 11 illustrates a second embodiment of the Taxi Clearance selection display shown in FIGS. 10 and 12-14, including additional graphical elements and detail. Common features will not be redundantly described herein. This particular embodiment of the Taxi Clearance selection display 1100 is a presentation of graphical elements and text displayed when a user selects the "Taxi Clearance" user-selectable option from the menu of user-selectable options shown in FIG. 3 (see reference 308). The Taxi Clearance selection display 1100 includes a Primary Flight Display (PFD) 1102 and an ATC message data interface 1104, consistent with the display presented in FIG. 3. Additionally, the ATC message data interface 1104 includes flight information 1106 that is continuously presented, during user interactions with an ATC message data interface 1104. The graphical elements and text presented by the ATC message data interface 1104 change based on user selections and current flight data. Here, after user selection of the "Taxi Clearance" user-selectable option, the ATC message data interface 1104 presents a timeline display 1108 that includes the ATC message data and the current flight path. Additionally, the timeline display 1108 includes effects and potential effects of the ATC message data on the current flight path, for informational purposes. Here, the timeline display 1108 is presented to provide flight crew members increased situational awareness and, in some embodiments, alerts for critical operations onboard the aircraft.

As shown, the timeline display 1108 includes a timeline 1110 of the current flight path that includes a taxiway display and indications of expected timing data for reaching each of the indicated points of the taxiway display associated with the current flight path. Additionally, the timeline 1110 includes notifications for the flight crew, positioned next to the timeline 1110 at time values and location points associated with the condition triggering the alert. For example, at point B2, the timeline 1110 presents an alert "HOLD SHORT AT B2". As another example, prior to point B2 and at the timeline location of the aircraft, the timeline 1110 presents an alert "CHECK SPEED CHECK SPEED −2 MINS TO STOP", indicating that there are two minutes remaining until the aircraft is required to stop on the taxiway against the ATC message "HOLD SHORT AT B2". These alerts are presented such that the flight crew is informed of the contents of one or more ATC messages that have been received onboard the aircraft, obtained by the ATC message consolidation system or computing device, and are presented via the ATC message data interface 1104, wherein the contents include transmitted messages that include instructions to the flight crew to (1) hold short at point B2 of the taxiway for the current flight path, and (2) check aircraft speed alert in view of two minutes remaining until the aircraft is required to stop on the taxiway, per the ATC instruction ("HOLD SHORT AT B2"). Such alerts and/or notifications are presented by the timeline display 1108 when the Taxi Clearance selection display 1100 is selected from the menu of user-selectable options.

Figure 12:
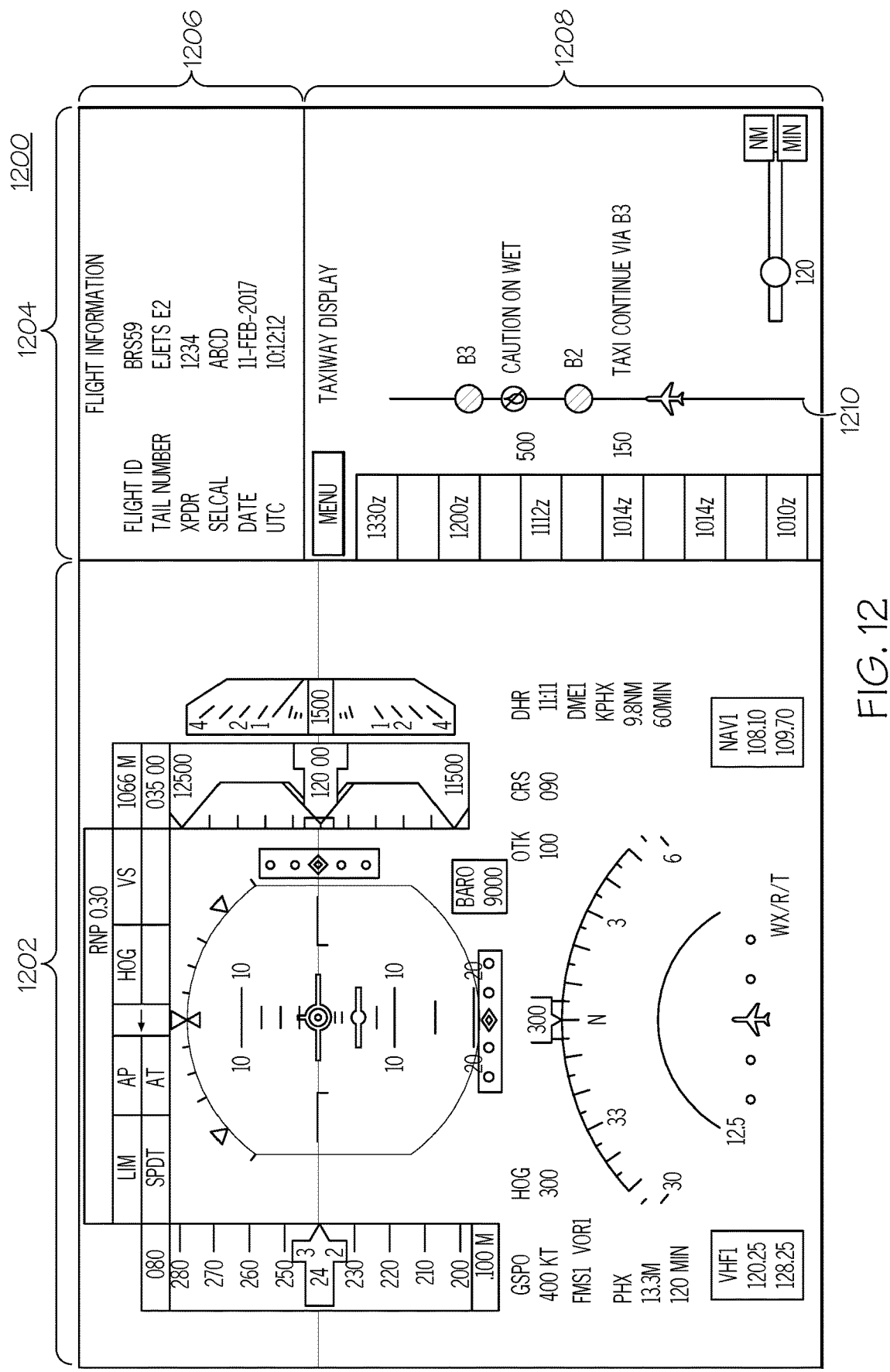

FIG. 12 is a third diagram of a Taxi Clearance selection display 1200, in accordance with the disclosed embodiments. It should be appreciated that FIG. 12 illustrates a third embodiment of the Taxi Clearance selection display shown in FIGS. 10-11 and 13-14, including additional graphical elements and detail. Common features will not be redundantly described herein. This particular embodiment of the Taxi Clearance selection display 1200 is a presentation of graphical elements and text displayed when a user selects the "Taxi Clearance" user-selectable option from the menu of user-selectable options shown in FIG. 3 (see reference 308). The Taxi Clearance selection display 1200 includes a Primary Flight Display (PFD) 1202 and an ATC message data interface 1204, consistent with the display presented in FIG. 3. Additionally, the ATC message data interface 1204 includes flight information 1206 that is continuously presented, during user interactions with an ATC message data interface 1204. The graphical elements and text presented by the ATC message data interface 1204 change based on user selections and current flight data. Here, after user selection of the "Taxi Clearance" user-selectable option, the ATC message data interface 1204 presents a timeline display 1208 that includes the ATC message data and the current flight path. Additionally, the timeline display 1208 includes effects and potential effects of the ATC message data on the current flight path, for informational purposes. Here, the timeline display 1208 is presented to provide flight crew members increased situational awareness and, in some embodiments, alerts for critical operations onboard the aircraft. As shown, the timeline display 1208 includes a timeline 1210 of the current flight path that includes a taxiway display and indications of expected timing data for reaching each of the indicated points of the taxiway display associated with the current flight path. Additionally, the timeline 1210 includes notifications for the flight crew, positioned next to the timeline 1210 at time values and location points associated with the condition triggering the alert.

For example, prior to point B2, the timeline 1210 presents an alert "TAXI CONTINUE VIA B3". As another example, after point B2 and prior to point B3, the timeline 1210 presents an alert "CAUTION ON WET", indicating condensation and potential slippery conditions on the taxiway. These alerts are presented such that the flight crew is informed of the contents of one or more ATC messages that have been received onboard the aircraft, obtained by the ATC message consolidation system or computing device, and are presented via the ATC message data interface 1204, wherein the contents include transmitted messages that include instructions to the flight crew to (1) continue taxi via point B3 of the taxiway for the current flight path, and (2) for the flight crew to use caution when encountering wet conditions on the taxiway. Such alerts and/or notifications are presented by the timeline display 1208 when the Taxi Clearance selection display 1200 is selected from the menu of user-selectable options.

Figure 13:
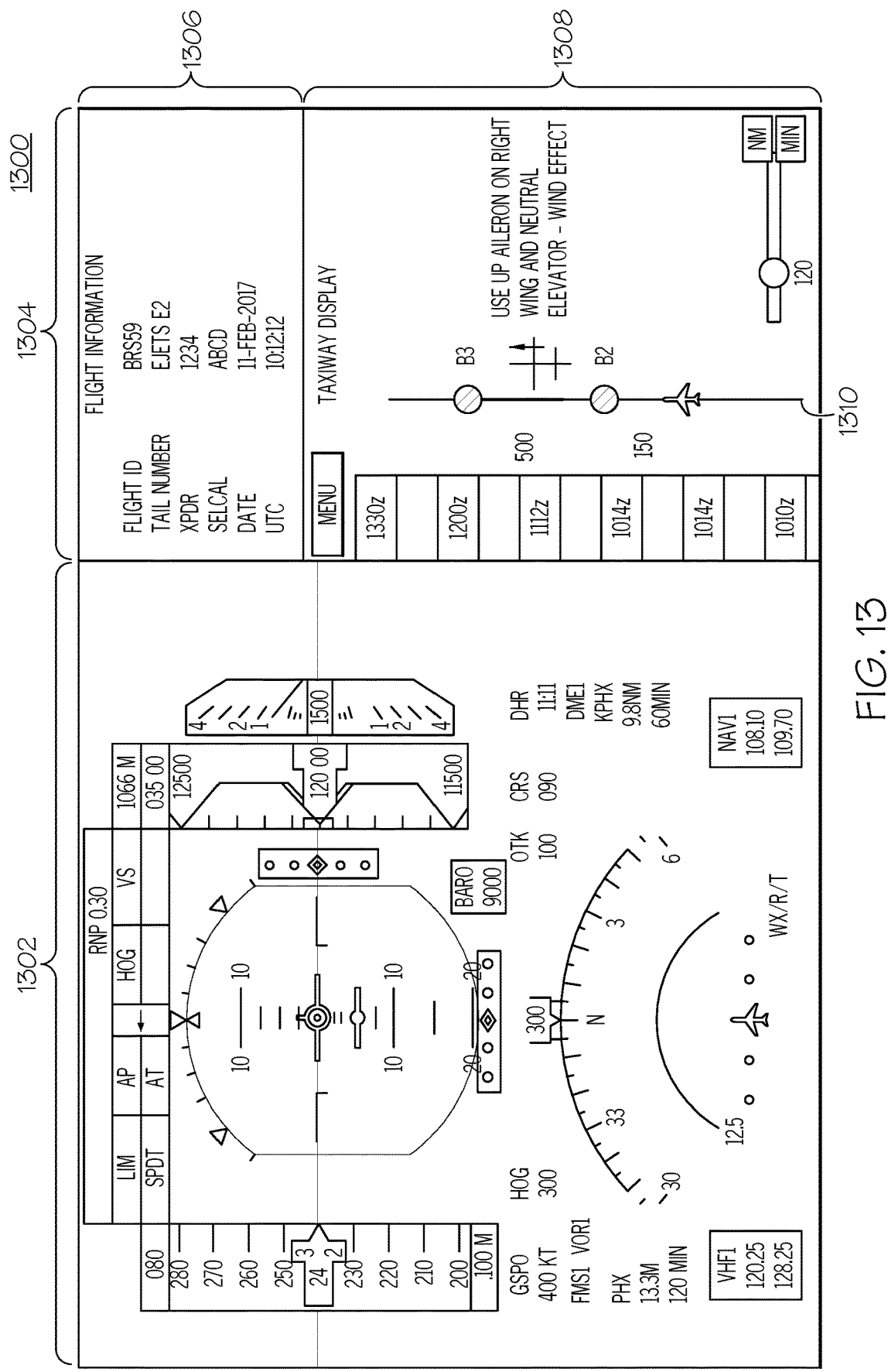

FIG. 13 is a fourth diagram of a Taxi Clearance selection display 1300, in accordance with the disclosed embodiments. It should be appreciated that FIG. 13 illustrates a fourth embodiment of the Taxi Clearance selection display shown in FIGS. 10-12 and 14, including additional graphical elements and detail. Common features will not be redundantly described herein. This particular embodiment of the Taxi Clearance selection display 1300 is a presentation of graphical elements and text displayed when a user selects the "Taxi Clearance" user-selectable option from the menu of user-selectable options shown in FIG. 3 (see reference 308). The Taxi Clearance selection display 1300 includes a Primary Flight Display (PFD) 1302 and an ATC message data interface 1304, consistent with the display presented in FIG. 3. Additionally, the ATC message data interface 1304 includes flight information 1306 that is continuously presented, during user interactions with an ATC message data interface 1304. The graphical elements and text presented by the ATC message data interface 1304 change based on user selections and current flight data. Here, after user selection of the "Taxi Clearance" user-selectable option, the ATC message data interface 1304 presents a timeline display 1308 that includes the ATC message data and the current flight path. Additionally, the timeline display 1308 includes effects and potential effects of the ATC message data on the current flight path, for informational purposes. Here, the timeline display 1308 is presented to provide flight crew members increased situational awareness and, in some embodiments, alerts for critical operations onboard the aircraft. As shown, the timeline display 1308 includes a timeline 1310 of the current flight path that includes a taxiway display and indications of expected timing data for reaching each of the indicated points of the taxiway display associated with the current flight path. Additionally, the timeline 1310 includes notifications for the flight crew, positioned next to the timeline 1310 at time values and location points associated with the condition triggering the alert.

For example, after point B2, the timeline 1310 presents a text alert "USE UP AILERON ON RIGHT WING AND NEUTRAL ELEVATOR—WIND EFFECT", in conjunction with a graphical element indicating the up-aileron on the right wing. This alerts is presented such that the flight crew is informed of the contents of one or more ATC messages that have been received onboard the aircraft, obtained by the ATC message consolidation system or computing device, and are presented via the ATC message data interface 1304, wherein the contents include transmitted messages that include instructions to the flight crew to use the up-aileron on the right wing and neutral elevator due to the wind effect. Such alerts and/or notifications are presented by the timeline display 1308 when the Taxi Clearance selection display 1300 is selected from the menu of user-selectable options.

Figure 14:
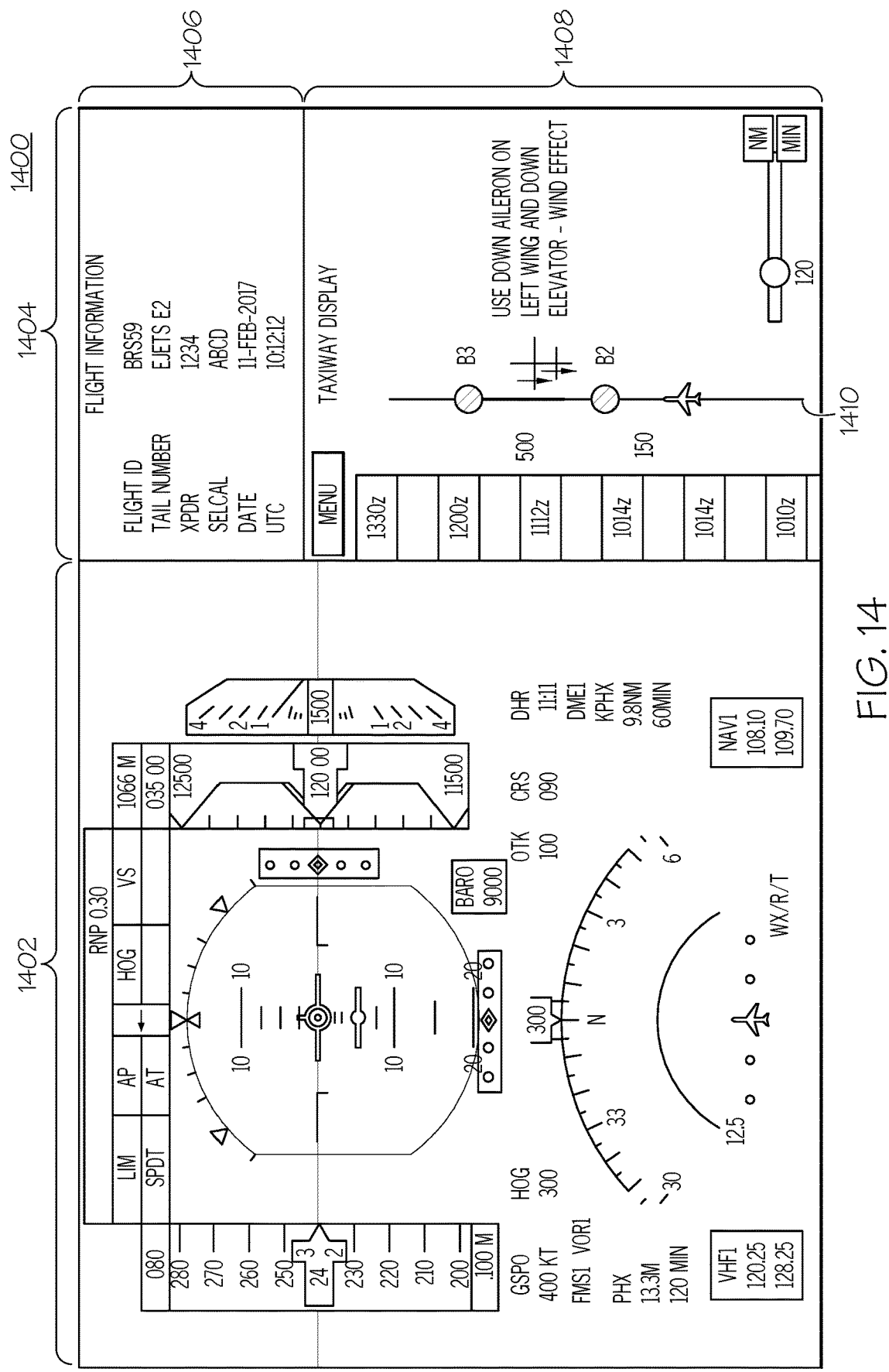

FIG. 14 is a fifth diagram of a Taxi Clearance selection display 1400, in accordance with the disclosed embodiments. It should be appreciated that FIG. 14 illustrates a second embodiment of the Taxi Clearance selection display shown in FIGS. 10-13, including additional graphical elements and detail. Common features will not be redundantly described herein. This particular embodiment of the Taxi Clearance selection display 1400 is a presentation of graphical elements and text displayed when a user selects the "Taxi Clearance" user-selectable option from the menu of user-selectable options shown in FIG. 3 (see reference 308). The Taxi Clearance selection display 1400 includes a Primary Flight Display (PFD) 1402 and an ATC message data interface 1404, consistent with the display presented in FIG. 3. Additionally, the ATC message data interface 1404 includes flight information 1406 that is continuously presented, during user interactions with an ATC message data interface 1404. The graphical elements and text presented by the ATC message data interface 1404 change based on user selections and current flight data. Here, after user selection of the "Taxi Clearance" user-selectable option, the ATC message data interface 1404 presents a timeline display 1408 that includes the ATC message data and the current flight path. Additionally, the timeline display 1408 includes effects and potential effects of the ATC message data on the current flight path, for informational purposes. Here, the timeline display 1408 is presented to provide flight crew members increased situational awareness and, in some embodiments, alerts for critical operations onboard the aircraft. As shown, the timeline display 1408 includes a timeline 1410 of the current flight path that includes a taxiway display and indications of expected timing data for reaching each of the indicated points of the taxiway display associated with the current flight path. Additionally, the timeline 1410 includes notifications for the flight crew, positioned next to the timeline 1410 at time values and location points associated with the condition triggering the alert.

For example, after point B2, the timeline 1410 presents a text alert "USE DOWN AILERON ON LEFT WING AND DOWN ELEVATOR—WIND EFFECT", in conjunction with a graphical element indicating the down-aileron on the left wing. This alerts is presented such that the flight crew is informed of the contents of one or more ATC messages that have been received onboard the aircraft, obtained by the ATC message consolidation system or computing device, and are presented via the ATC message data interface 1404, wherein the contents include transmitted messages that include instructions to the flight crew to use the down-aileron on the left wing and down elevator due to the wind effect. Such alerts and/or notifications are presented by the timeline display 1408 when the Taxi Clearance selection display 1400 is selected from the menu of user-selectable options.

Figure 15:
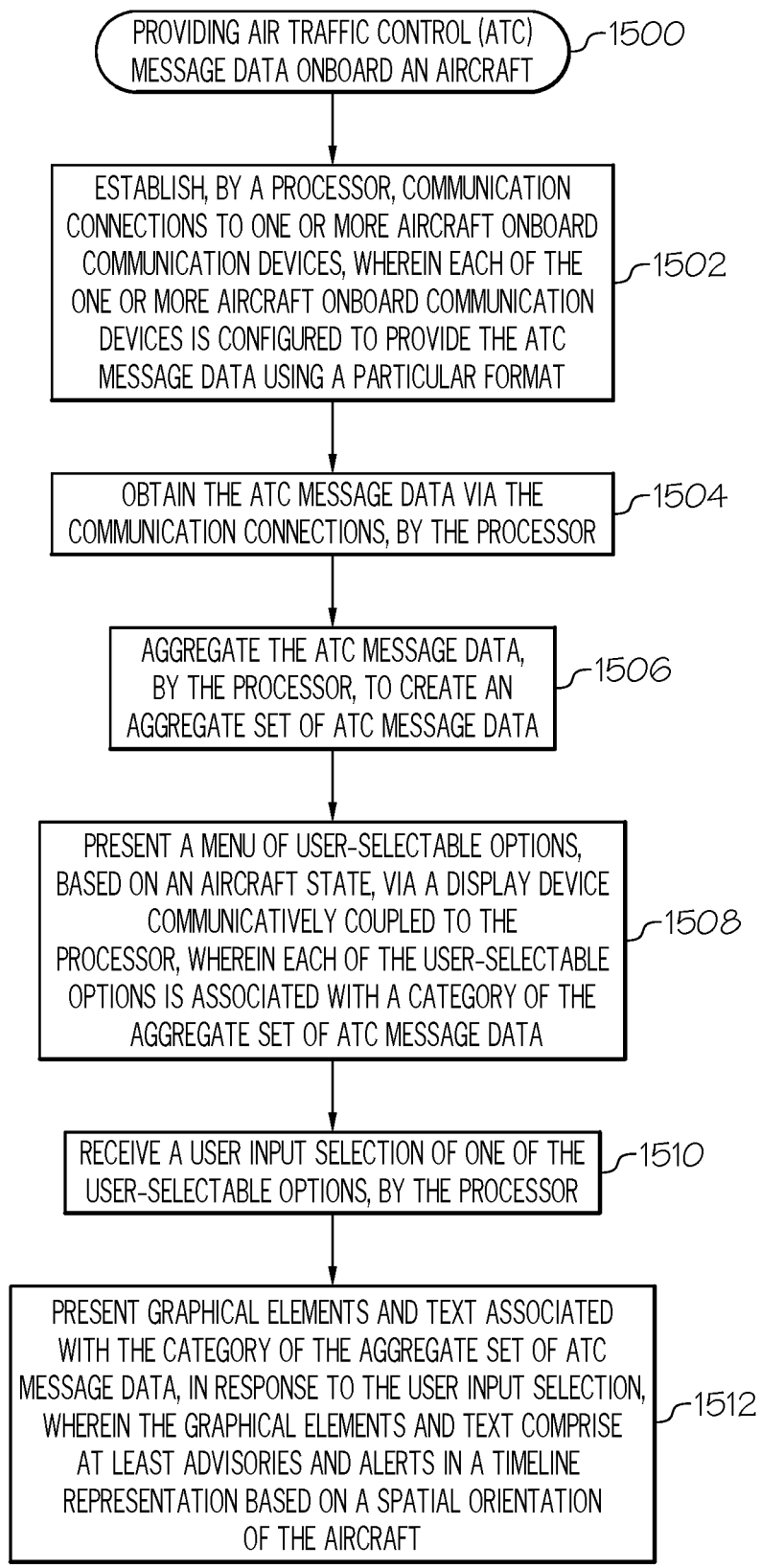
FIG. 15 is a flow chart illustrating an embodiment of a process for providing air traffic control (ATC) message data onboard an aircraft, in accordance with the disclosed embodiments.

FIG. 15 is a flow chart illustrating an embodiment of a process 1500 for providing air traffic control (ATC) message data onboard an aircraft, in accordance with the disclosed embodiments. The various tasks performed in connection with process 1500 may be performed by software, hardware, firmware, or any combination thereof. For illustrative purposes, the following description of process 1500 may refer to elements mentioned above in connection with FIGS. 1-14. In practice, portions of process 1500 may be performed by different elements of the described system. It should be appreciated that process 1500 may include any number of additional or alternative tasks, the tasks shown in FIG. 15 need not be performed in the illustrated order, and process 1500 may be incorporated into a more comprehensive procedure or process having additional functionality not described in detail herein. Moreover, one or more of the tasks shown in FIG. 15 could be omitted from an embodiment of the process 1500 as long as the intended overall functionality remains intact.

First, the process 1500 establishes, by a processor, communication connections to one or more aircraft onboard communication devices, wherein each of the one or more aircraft onboard communication devices is configured to provide the ATC message data using a particular format (step 1502). The process 1500 may establish wired and/or wireless communication connections to the one or more communication devices. The one or more aircraft onboard communication devices comprising at least one of a cockpit receiver, a Controller Pilot Datalink Communication (CP-DLC) device, an Automatic Terminal Information Service (ATIS) receiver device, a Notice to Airmen (NOTAM) receiver device, or an aircraft radio. Each of the ATC messages may be transmitted and received using different formats that correspond to the aircraft onboard communication device from which the ATC message was received. For example, each of the received ATC messages may include voice data or speech data, text data, broadcast data, radio transmission data, graphical elements, uploaded datalink data, or the like.

Next, the process 1500 obtains the ATC message data via the communication connections, by the processor (step 1504), and the process 1500 then aggregates the ATC message data, by the processor, to create an aggregate set of ATC message data (step 1506). Here, the process 1500 obtains the ATC message data that has been transmitted to the aircraft, and received by the aircraft, using more than one communication device and more than one communication format. The process 1500 then consolidates the ATC message data (which has been received via multiple communication devices and includes multiple formats) such that the consolidated ATC message data may be presented via one computing device and/or one display.

The process 1500 presents a menu of user-selectable options based on an aircraft state, via a display device communicatively coupled to the processor, wherein each of the user-selectable options is associated with a category of the aggregate set of ATC message data (step 1508). The menu of user-selectable options may be presented as a series of graphical elements on a touchscreen configured to receive user input selection, or on a display communicatively coupled to a user interface configured to receive user input selections. One exemplary embodiment of the menu of user-selectable options is described with regard to FIG. 3. The menu of user-selectable options may include: Oceanic Clearance Monitoring System (OCMS); Air Traffic Control (ATC) Timeline; Notice to Airmen (NOTAM); Terminal Weather Information for Pilots (TWIP); Air Traffic Information System (ATIS); Taxi Clearance; Reporting Points; Flight Interval Management (FIM); Approach Preview, and any other potential option for which graphical elements and text may be presented, in the context of flight path timing data and a flight path timeline, using a display and/or computing device onboard the aircraft during flight. Each of the menu of user-selectable option is associated with a category of the aggregate set of ATC message data. For example, the OCMS selectable option is associated with OCMS data for the aircraft. As another example, the NOTAM selectable option is associated with NOTAM data received and stored onboard the aircraft. As a third example, the ATIS selectable option is associated with ATIS data received and stored onboard the aircraft.

The series of graphical elements included in menu of user-selectable options is determined by a current aircraft state. The aircraft state comprises at least an aircraft position, fuel flow of the aircraft, a current phase of flight, a current aircraft mission, and a current spatial orientation of the aircraft. Each of the user-selectable options presents data that is updated, continuously and dynamically, during execution of the current flight plan.

The process 1500 receives a user input selection of one of the user-selectable options, by the processor (step 1510). Here, the user selects one particular option, and thus, one particular category of aggregated ATC message data for presentation by the process 1500 and viewing by the user. One exemplary embodiment of the menu of user-selectable options is described herein with regard to FIG. 3, reference 308.

The process 1500 then presents graphical elements and text associated with the category of the aggregate set of ATC message data, in response to the user input selection (step 1512). Generally, when one of the user-selectable options of the menu is selected, the process 1500 presents (i) a graphical element representation of a timeline of the current flight plan, (ii) a graphical element representation of the aircraft (according to the aircraft position along the timeline and the current spatial orientation of the aircraft), and (iii) other data, warnings or alerts, and advisories associated with the particular category of data represented by the user-selectable option label. Here, the process 1500 presents graphical elements and text comprising at least advisories and alerts in the timeline representation, based on the spatial orientation of the aircraft.

In a first embodiment, the process 1500 presents a first graphical element labeled Oceanic Clearance Monitoring System (OCMS), wherein the menu of user-selectable options comprises the first graphical element, and wherein the category of the aggregate set of the ATC message data comprises oceanic clearance data comprising at least an oceanic entry point and time bounds for the oceanic entry point. In this embodiment, the process 1500 receives a first OCMS user input selection of the first graphical element, wherein the user input selection comprises the first OCMS user input selection. Once the OCMS option is selected by the user, the process 1500 presents graphical elements and text associated with the OCMS data, such that the user may interact with the OCMS data by selecting particular data and/or graphical elements for viewing. For example, the process 1500 may receive a second OCMS user input selection to monitor the oceanic entry point. In response to receiving the second OCMS user input selection, the process 1500 arms the OCMS and initiates monitoring of the oceanic entry point with respect to the time bounds, wherein the graphical elements and text comprise at least: a timeline representative of the time bounds, and alerts associated with the oceanic entry point and the time bounds.

In a second embodiment, the process 1500 presents a second graphical element labeled Air Traffic Control (ATC) Timeline, wherein the menu of user-selectable options comprises the second graphical element, and wherein the category of the aggregate set of the ATC message data comprises ATC timeline data comprising at least a received ATC message, a current flight path for the aircraft, timing data associated with the flight path, and potential effects on the flight path corresponding to the received ATC message. In this embodiment, the process 1500 receives an ATC Timeline user input selection of the second graphical element, wherein the user input selection comprises the ATC Timeline user input selection, and wherein the graphical elements and text comprise at least a timeline display of the received ATC message, the current flight path, and the potential effects.

In a third embodiment, the process 1500 presents a third graphical element labeled Notice to Airman (NOTAM), wherein the menu of user-selectable options comprises the third graphical element, and wherein the category of the aggregate set of the ATC message data comprises NOTAM data, a current flight path for the aircraft, and timing data associated with the current flight path. In this embodiment, the process 1500 receives a NOTAM user input selection of the third graphical element, wherein the user input selection comprises the NOTAM user input selection, wherein the graphical elements and text comprise at least a timeline display of the timing data, the NOTAM data, and the current flight path.

In a fourth embodiment, the process 1500 presents a fourth graphical element labeled Taxi Clearance, wherein the menu of user-selectable options comprises the fourth graphical element, and wherein the category of the aggregate set of the ATC message data comprises taxi clearance data, a current flight path for the aircraft, and timing data associated with the current flight path. In this embodiment, the process 1500 receives a Taxi Clearance user input selection of the fourth graphical element, wherein the user input selection comprises the Taxi Clearance user input selection, wherein the graphical elements and text comprise at least a timeline display of the timing data, the taxi clearance data, and the current flight path.

In some embodiments, the process 1500 presents the menu of user-selectable options using a dedicated display device onboard the aircraft, wherein the dedicated display device presents only the consolidated ATC message data, including the menu and the graphical elements and text associated with a user selection of one of the menu options. In other embodiments, the process 1500 presents the menu of user-selectable options concurrently with a standard aircraft display, such that one of the standard aircraft displays functions to present ATC message data in addition to other aircraft data. For example, the process 1500 may present the menu of user-selectable options concurrently with a Primary Flight Display (PFD) graphical display, and present the graphical elements and text associated with the category concurrently with the PFD graphical display. Thus, the process 1500 provides a consolidated display of aggregated ATC message data for increased situational awareness of the flight crew.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 2 depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for providing air traffic control (ATC) message data onboard an aircraft, the method comprising:
    establishing, by a processor, communication connections to one or more aircraft onboard communication devices, wherein each of the one or more aircraft onboard communication devices is configured to provide the ATC message data using a particular format;
    obtaining the ATC message data via the communication connections, by the processor;
    aggregating the ATC message data, by the processor, to create an aggregate set of ATC message data;
    presenting a menu of user-selectable options based on an aircraft state, via a display device communicatively coupled to the processor, wherein each of the user-selectable options is associated with a category of the aggregate set of ATC message data, and wherein the aircraft state comprises at least an aircraft position, fuel flow of the aircraft, a current phase of flight, a current aircraft mission, and a current spatial orientation of the aircraft;
    receiving a user input selection of one of the user-selectable options, by the processor; and presenting graphical elements and text associated with the category of the aggregate set of ATC message data, in response to the user input selection, wherein the menu of user-selectable options comprises a first graphical element labeled Oceanic Clearance Monitoring System (OCMS), and the category of the aggregate set of the ATC message data comprises oceanic clearance data comprising at least an oceanic entry point and time bounds for the oceanic entry point; and wherein the method further comprises:
 receiving a first OCMS user input selection of the first graphical element, wherein the user input selection comprises the first OCMS user input selection;
 receiving a second OCMS user input selection to arm the oceanic entry point; and
 in response to receiving the second OCMS user input selection, the OCMS initiates monitoring of the oceanic entry point with respect to the time bounds, wherein the graphical elements and text comprise at least: (i) a timeline representative of the time bounds, and (ii) alerts associated with the oceanic entry point and the time bounds.

2. The method of claim 1, wherein the one or more aircraft onboard communication devices comprising at least one of a cockpit receiver, a Controller Pilot Datalink Communication (CPDLC) device, an Automatic Terminal Information Service (ATIS) receiver device, a Notice to Airmen (NOTAM) receiver device, or an aircraft radio.

3. The method of claim 1, further comprising:
presenting the menu of user-selectable options concurrently with a Primary Flight Display (PFD) graphical display based on the aircraft state; and
presenting the graphical elements and text associated with the category concurrently with the PFD graphical display using a timeline representation, wherein the graphical elements and text comprise one or more of symbology, visual cues, and textual cues including advisories and alerts for recommendations using the timeline representation based on a spatial orientation of the aircraft.

4. The method of claim 1, further comprising:
presenting a second graphical element labeled Air Traffic Control (ATC) Timeline, wherein the menu of user-selectable options comprises the second graphical element, and wherein the category of the aggregate set of the ATC message data comprises ATC timeline data comprising at least a received ATC message, a current flight path for the aircraft, timing data associated with the flight path, potential effects on the flight path corresponding to the received ATC message, and advisories associated with the potential effects; and
receiving an ATC Timeline user input selection of the second graphical element, wherein the user input selection comprises the ATC Timeline user input selection;
wherein the graphical elements and text comprise at least a timeline display of the received ATC message, the current flight path, the potential effects, and the advisories.

5. The method of claim 4, further comprising:
presenting a third graphical element labeled Notice to Airman (NOTAM), wherein the menu of user-selectable options comprises the third graphical element, and wherein the category of the aggregate set of the ATC message data comprises NOTAM data, a current flight path for the aircraft, and timing data associated with the current flight path; and receiving a NOTAM user input selection of the third graphical element, wherein the user input selection comprises the NOTAM user input selection;
wherein the graphical elements and text comprise at least a timeline display of the timing data, the NOTAM data, the current flight path, and advisories associated with the NOTAM data and the current flight path.

6. The method of claim 5, further comprising:
presenting a fourth graphical element labeled Taxi Clearance, wherein the menu of user-selectable options comprises the fourth graphical element, and wherein the category of the aggregate set of the ATC message data comprises taxi clearance data, a current flight path for the aircraft, and timing data associated with the current flight path; and
receiving a Taxi Clearance user input selection of the fourth graphical element, wherein the user input selection comprises the Taxi Clearance user input selection;
wherein the graphical elements and text comprise at least a timeline display of the timing data, the taxi clearance data, the current flight path, and advisories associated with the timing data, the taxi clearance data, and the current flight path.

7. A system for providing air traffic control (ATC) message data onboard an aircraft, the system comprising:
a system memory element;
a plurality of communication connections to one or more aircraft external communication devices that provide communication datalinks between the aircraft and air traffic control (ATC), wherein each of the one or more aircraft onboard communication devices is configured to provide the ATC message data using a particular format;
a display device, configured to present graphical elements and text associated with aircraft data;
a user interface, configured to receive user input selections from a menu of user-selectable options; and
at least one processor, communicatively coupled to the system memory element, the one or more aircraft onboard communication devices, the display device, and the user interface, the at least one processor configured to:
 obtain the ATC message data via the communication connections;
 aggregate the ATC message data to create an aggregate set of ATC message data;
 present a menu of user-selectable options based on an aircraft state, via the display device, wherein each of the user-selectable options is associated with a category of the aggregate set of ATC message data, and wherein the aircraft state comprises at least an aircraft position, fuel flow of the aircraft, a current phase of flight, a current aircraft mission, and a current spatial orientation of the aircraft;
 receive a user input selection of one of the user-selectable options, via the user interface; and
 present graphical elements and text associated with the category of the aggregate set of ATC message data, in response to the user input selection,
 wherein:
  the menu of user-selectable options comprises at least a first graphical element labeled Oceanic Clearance Monitoring System (OCMS),
  the category of the aggregate set of the ATC message data comprises oceanic clearance data comprising at least an oceanic entry point and time bounds for the oceanic entry point; and when the user input selection comprises the graphical element labeled OCMS, the at least one processor is further configured to:
receive an OCMS user input selection to arm the oceanic entry point; and
in response to receiving the OCMS user input selection, initiate monitoring of the oceanic entry point with respect to the time bounds;
wherein the graphical elements and text comprise at least: (i) a timeline representative of the time bounds, and (ii) alerts associated with the oceanic entry point and the time bounds.

8. The system of claim 7, wherein the one or more aircraft onboard communication devices comprising at least one of a cockpit receiver, a Controller Pilot Datalink Communication (CPDLC) device, an Automatic Terminal Information Service (ATIS) receiver device, a Notice to Airmen (NOTAM) receiver device, or an aircraft radio.

9. The system of claim 7, wherein the display device is further configured to present Primary Flight Display (PFD) graphical elements and text; and
wherein the at least one processor is further configured to present the menu of user-selectable options concurrently with the PFD graphical elements and text, via the display device.

10. The system of claim 7, wherein the menu of user-selectable options comprises at least a graphical element labeled Air Traffic Control (ATC) Timeline;
wherein, when the user input selection comprises the graphical element labeled ATC Timeline,
the category of the aggregate set of the ATC message data comprises ATC timeline data comprising at least a received ATC message, a current flight path for the aircraft, timing data associated with the flight path, potential effects on the flight path corresponding to the received ATC message, and advisories associated with the potential effects; and
the graphical elements and text comprise at least a timeline display of the received ATC message, the flight path, the potential effects, and the advisories.

11. The system of claim 7, wherein the menu of user-selectable options comprises at least a graphical element labeled Notice to Airman (NOTAM);
wherein, when the user input selection comprises the graphical element labeled NOTAM,
the category of the aggregate set of the ATC message data comprises NOTAM data, a current flight path for the aircraft, and timing data associated with the current flight path; and
the graphical elements and text comprise at least a timeline display of the timing data, the NOTAM data, the current flight path, and advisories associated with the NOTAM data and the current flight path.

12. The system of claim 7, wherein the menu of user-selectable options comprises at least a graphical element labeled Taxi Clearance;
wherein, when the user input selection comprises the graphical element labeled Taxi Clearance,
the category of the aggregate set of the ATC message data comprises taxi clearance data, a current flight path for the aircraft, and timing data associated with the current flight path; and
the graphical elements and text comprise at least a timeline display of the timing data, the taxi clearance data, and the current flight path, and advisories associated with the timing data, the taxi clearance data, and the current flight path.

13. A non-transitory, computer-readable medium containing instructions thereon, which, when executed by a processor, perform a method for providing air traffic control (ATC) message data onboard an aircraft, the method comprising:
establishing, by the processor, communication connections to one or more aircraft onboard communication devices, wherein each of the one or more aircraft onboard communication devices is configured to provide the ATC message data using a particular format, and wherein the one or more aircraft onboard communication devices comprising at least one of a cockpit receiver, a Controller Pilot Datalink Communication (CPDLC) device, an Automatic Terminal Information Service (ATIS) receiver device, a Notice to Airmen (NOTAM) receiver device, or an aircraft radio;
obtaining the ATC message data via the communication connections, by the processor;
aggregating the ATC message data, by the processor, to create an aggregate set of ATC message data;
presenting a menu of user-selectable options based on an aircraft state, via a display device communicatively coupled to the processor, wherein each of the user-selectable options is associated with a category of the aggregate set of ATC message data, and wherein the aircraft state comprises at least an aircraft position, fuel flow of the aircraft, a current phase of flight, a current aircraft mission, and a current spatial orientation of the aircraft;
receiving a user input selection of one of the user-selectable options, by the processor; and
presenting graphical elements and text associated with the category of the aggregate set of ATC message data, in response to the user input selection,
wherein the menu of user-selectable options comprises a first graphical element labeled Oceanic Clearance Monitoring System (OCMS), and the category of the aggregate set of the ATC message data comprises oceanic clearance data comprising at least an oceanic entry point and time bounds for the oceanic entry point, and
wherein the method further comprises:
receiving a first OCMS user input selection of the first graphical element, wherein the user input selection comprises the first OCMS user input selection;
receiving a second OCMS user input selection to arm the oceanic entry point; and
in response to receiving the second OCMS user input selection, arming the OCMS and initiate monitoring of the oceanic entry point with respect to the time bounds,
wherein the graphical elements and text comprise at least: (i) a timeline representative of the time bounds, and (ii) alerts associated with the oceanic entry point and the time bounds.

14. The non-transitory, computer-readable medium of claim 13, wherein the method further comprises:
presenting the menu of user-selectable options concurrently with a Primary Flight Display (PFD) graphical display based on the aircraft state; and
presenting the graphical elements and text associated with the category concurrently with the PFD graphical display using a timeline representation, wherein the graphical elements and text comprise one or more of symbology, visual cues, and textual cues including advisories and alerts for recommendations using the timeline representation based on a spatial orientation of the aircraft.

15. The non-transitory, computer-readable medium of claim 13, wherein the method further comprises:
presenting a second graphical element labeled Air Traffic Control (ATC) Timeline, wherein the menu of user-selectable options comprises the second graphical element, and wherein the category of the aggregate set of the ATC message data comprises ATC timeline data comprising at least a received ATC message, a current flight path for the aircraft, timing data associated with the flight path, potential effects on the flight path corresponding to the received ATC message, and advisories associated with the potential effects; and
receiving an ATC Timeline user input selection of the second graphical element, wherein the user input selection comprises the ATC Timeline user input selection;
wherein the graphical elements and text comprise at least a timeline display of the received ATC message, the current flight path, the potential effects, and the advisories.

16. The non-transitory, computer-readable medium of claim 15, wherein the method further comprises:
presenting a third graphical element labeled Notice to Airman (NOTAM), wherein the menu of user-selectable options comprises the third graphical element, and wherein the category of the aggregate set of the ATC message data comprises NOTAM data, a current flight path for the aircraft, timing data associated with the flight path, and advisories based on the NOTAM data, the current flight path, and the timing data; and
receiving a NOTAM user input selection of the third graphical element, wherein the user input selection comprises the NOTAM user input selection;
wherein the graphical elements and text comprise at least a timeline display of the timing data, the NOTAM data, the current flight path, and the advisories.

17. The non-transitory, computer-readable medium of claim 16, wherein the method further comprises:
presenting a fourth graphical element labeled Taxi Clearance, wherein the menu of user-selectable options comprises the fourth graphical element, and wherein the category of the aggregate set of the ATC message data comprises taxi clearance data, a current flight path for the aircraft, timing data associated with the current flight path, and advisories based on the taxi clearance data, the current flight path, and the timing data; and
receiving a Taxi Clearance user input selection of the fourth graphical element, wherein the user input selection comprises the Taxi Clearance user input selection;
wherein the graphical elements and text comprise at least a timeline display of the timing data, the taxi clearance data, the current flight path, and the advisories.

* * * * *